United States Patent
Ikegaya et al.

(10) Patent No.: US 10,452,292 B2
(45) Date of Patent: Oct. 22, 2019

(54) COMPUTER SYSTEM

(71) Applicant: HITACHI, LTD., Tokyo (JP)

(72) Inventors: Naoko Ikegaya, Tokyo (JP); Nobuhiro Maki, Tokyo (JP); Akira Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 298 days.

(21) Appl. No.: 15/039,983

(22) PCT Filed: Mar. 7, 2014

(86) PCT No.: PCT/JP2014/056058
§ 371 (c)(1),
(2) Date: May 27, 2016

(87) PCT Pub. No.: WO2015/132973
PCT Pub. Date: Sep. 11, 2015

(65) Prior Publication Data
US 2017/0220285 A1    Aug. 3, 2017

(51) Int. Cl.
*G06F 3/06* (2006.01)

(52) U.S. Cl.
CPC ........... *G06F 3/0631* (2013.01); *G06F 3/061* (2013.01); *G06F 3/067* (2013.01); *G06F 3/0662* (2013.01); *G06F 3/0665* (2013.01); *G06F 3/0683* (2013.01)

(58) Field of Classification Search
None
See application file for complete search history.

(56) References Cited

U.S. PATENT DOCUMENTS

| | | | | |
|---|---|---|---|---|
| 7,865,676 | B2 * | 1/2011 | Nagata | G06F 3/061 709/217 |
| 8,074,090 | B2 * | 12/2011 | Nakagawa | G06F 1/3221 713/320 |
| 2007/0174544 | A1 | 7/2007 | Yasuda et al. | |
| 2008/0034005 | A1 | 2/2008 | Satoyama et al. | |
| 2011/0208940 | A1 * | 8/2011 | Naganuma | G06F 3/0604 711/170 |
| 2013/0117448 | A1 * | 5/2013 | Nahum | G06F 3/0607 709/225 |

OTHER PUBLICATIONS

International Search Report of PCT/JP2014/056058 dated Jun. 10, 2014.

* cited by examiner

*Primary Examiner* — Reginald G Bragdon
*Assistant Examiner* — Kimbleann C Verdi
(74) *Attorney, Agent, or Firm* — Mattingly & Malur, PC

(57) ABSTRACT

In a scale-out type storage in which multiple physical storage systems are provided collectively as a single virtual storage system, a logical path is established between the host computer and the virtual storage system so that input/output performance of the storage is not deteriorated, wherein during allocation of a volume to the virtual storage system, if a logical control unit (logical CU) establishing a logical path to a volume is unallocated, a logical CU and a volume is generated to a storage system having either a small number of allocated logical CUs or a small amount of used storage capacity. On the other hand, if there is a storage system having a logical CU already allocated thereto, a volume is generated in that storage system.

18 Claims, 19 Drawing Sheets

Fig. 3

CONFIGURATION INFORMATION OF VIRTUAL STORAGE SYSTEM

| VIRTUAL STORAGE SYSTEM IDENTIFIER | STORAGE SYSTEM IDENTIFIER 1 | STORAGE SYSTEM IDENTIFIER 2 | STORAGE SYSTEM IDENTIFIER 3 | STORAGE SYSTEM IDENTIFIER 4 |
|---|---|---|---|---|
| VDKC1 | RDKC1 | RDKC2 | RDKC3 | RDKC4 |
| VDKC2 | RDKC1 | RDKC2 | — | — |
| VDKC3 | RDKC3 | — | — | — |

Fig. 4

CONNECTION INFORMATION OF STORAGE SYSTEM
CONSTITUTING VIRTUAL STORAGE SYSTEM

| | STORAGE SYSTEM IDENTIFIER RDKC1 | STORAGE SYSTEM IDENTIFIER RDKC2 | STORAGE SYSTEM IDENTIFIER RDKC3 | STORAGE SYSTEM IDENTIFIER RDKC4 |
|---|---|---|---|---|
| STORAGE SYSTEM IDENTIFIER RDKC1 | — | — | — | — |
| STORAGE SYSTEM IDENTIFIER RDKC2 | HIGH BANDWIDTH | — | — | — |
| STORAGE SYSTEM IDENTIFIER RDKC3 | HIGH BANDWIDTH | HIGH BANDWIDTH | — | — |
| STORAGE SYSTEM IDENTIFIER RDKC4 | MID BANDWIDTH | MID BANDWIDTH | MID BANDWIDTH | — |

Fig. 5

LOGICAL CU ALLOCATION INFORMATION OF VIRTUAL STORAGE SYSTEM

| VIRTUAL STORAGE SYSTEM IDENTIFIER | LOGICAL CU NUMBER | STORAGE SYSTEM IDENTIFIER 1 | STORAGE SYSTEM IDENTIFIER 2 | STORAGE SYSTEM IDENTIFIER 3 |
|---|---|---|---|---|
| VDKC1 | 1 | RDKC1 | — | — |
| VDKC1 | 2 | RDKC2 | — | — |
| VDKC2 | 2 | RDKC1 | RDKC2 | — |

Fig. 6

LOGICAL CU ALLOCATION INFORMATION OF STORAGE SYSTEM

| VIRTUAL STORAGE SYSTEM IDENTIFIER | LOGICAL CU NUMBER | GDEV NUMBER | STORAGE SYSTEM IDENTIFIER | LDEV NUMBER | CAPACITY |
|---|---|---|---|---|---|
| VDKC1 | 1 | 1 | — | 0 | 27G |
| VDKC1 | 1 | 2 | — | 1 | 9G |
| VDKC2 | 2 | 1 | — | 2 | 9G |
| VDKC2 | 2 | 2 | RDKC2 | — | — |

Fig. 7

CAPACITY MANAGEMENT INFORMATION OF STORAGE SYSTEM

| VIRTUAL STORAGE SYSTEM IDENTIFIER (701) | ALLOCATION MAXIMUM STORAGE CAPACITY (702) |
|---|---|
| VDKC1 | 1000G |
| VDKC2 | 200G |

Fig. 8

LOGICAL CU ACCESS FREQUENCY MANAGEMENT INFORMATION OF STORAGE SYSTEM

| VIRTUAL STORAGE SYSTEM IDENTIFIER (801) | LOGICAL CU NUMBER (802) | GDEV NUMBER (803) | STORAGE SYSTEM IDENTIFIER (804) | NUMBER OF ACCESSES (805) | TIME PERIOD (806) |
|---|---|---|---|---|---|
| VDKC1 | 1 | 1 | — | 100 | ONE DAY |
| VDKC1 | 1 | 2 | — | 10 | ONE DAY |
| VDKC2 | 2 | 1 | — | 100 | ONE HOUR |
| VDKC2 | 2 | 2 | RDKC2 | — | — |

Fig. 9

CONFIGURATION INFORMATION OF STORAGE SYSTEM

| STORAGE SYSTEM IDENTIFIER | STORAGE CAPACITY | PROCESSOR PERFORMANCE | CACHE CAPACITY |
|---|---|---|---|
| RDKC1 | 4000GB | 100 | 200GB |
| RDKC2 | 3000GB | 200 | 100GB |
| RDKC3 | 2000GB | 100 | 200GB |
| RDKC4 | 1000GB | 200 | 100GB |

Fig. 16
LOGICAL CONFIGURATION EXAMPLE OF VIRTUAL STORAGE SYSTEM WHERE PATH FAILURE HAS OCCURRED
(a) DURING NORMAL STATE
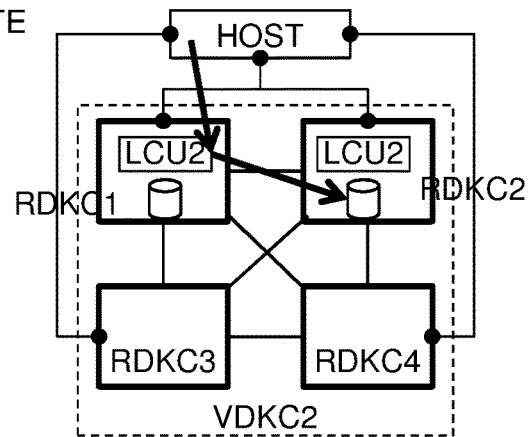
(b) DURING PATH FAILURE
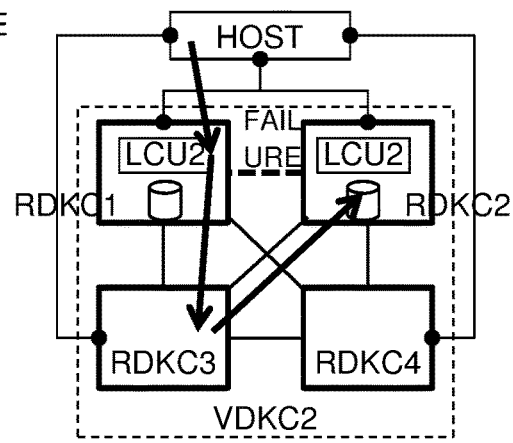
(c) AFTER MIGRATING CU
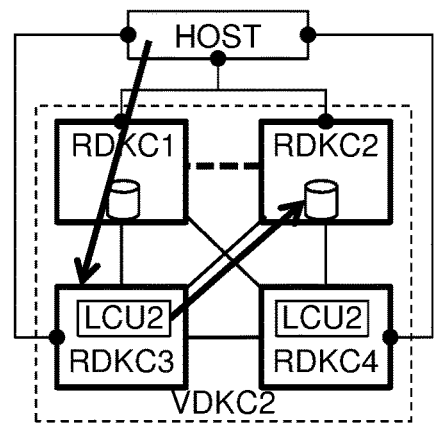

Fig. 18

CONFIGURATION INFORMATION OF VIRTUAL STORAGE SYSTEM
DURING PATH FAILURE

| | STORAGE SYSTEM IDENTIFIER RDKC1 (402) | STORAGE SYSTEM IDENTIFIER RDKC2 (403) | STORAGE SYSTEM IDENTIFIER RDKC3 (404) | STORAGE SYSTEM IDENTIFIER RDKC4 (405) |
|---|---|---|---|---|
| STORAGE SYSTEM IDENTIFIER RDKC1 (412) | — | — | — | — |
| STORAGE SYSTEM IDENTIFIER RDKC2 (413) | ~~HIGH BANDWIDTH~~ | — | — | — |
| STORAGE SYSTEM IDENTIFIER RDKC3 (414) | HIGH BANDWIDTH | HIGH BANDWIDTH | — | — |
| STORAGE SYSTEM IDENTIFIER RDKC4 (415) | MID BANDWIDTH (441) | MID BANDWIDTH (442) | MID BANDWIDTH (443) | — |

COMPUTER SYSTEM

TECHNICAL FIELD

The present invention relates to the art of a computer system having multiple storage systems.

BACKGROUND ART

Along with increasing demands for enhanced scale and improved performance of computer systems, the art related to scale-out type storages is attracting attention, which integrates multiple physical storage systems as a single system and provides superior performance and capacity equivalent to that of a large-scale storage system. One known method for operating such scale-out type storage is to virtualize the multiple storage systems logically as a single storage resource.

For example, Patent Literature 1 teaches having a control unit convert an identifier of a logical device (hereinafter referred to as "LDEV") of a real storage to identifier of an LDEV of a virtual storage, so that the individually operated storage systems can be used as components of a virtual storage system. It also teaches managing logical paths in LDEV units.

On the other hand, there exists a system where a host computer retains a configuration definition of logical paths connecting the LDEVs and host computer, and establishing each logical path in units of logical control units (hereinafter referred to as "logical CUs") when establishing logical paths.

For example, Patent Literature 2 teaches a host computer defining the configuration of logical CUs and the LDEVs being accessed via logical paths of the logical CUs.

CITATION LIST

Patent Literature

[PTL 1] US Patent Application Publication No. 2008/0034005
[PTL 2] US Patent Application Publication No. 2007/0174544

SUMMARY OF INVENTION

Technical Problem

One considerable method for constituting a scale-out type storage is to allocate an identical virtual storage system number to multiple storage systems, and designing the system so that all the storage systems can receive a request to establish a logical path from the host computer by physically connecting the host computer and the multiple storage systems.

If the host computer is a mainframe (hereinafter also referred to as "MF"), a maximum of eight logical paths can be defined per logical CU, so that a logical path with a maximum of eight storage systems can be established. It is also possible to establish a logical path to an identical CU from multiple host computers. When the MF establishes multiple logical paths, the MF uses the logical paths sequentially in order during execution of input/output (I/O).

There are storage systems for MFs capable of constituting a maximum of 256 logical CUs per storage system and those capable of constituting a maximum of 256 LDEVs per logical CU. In the description, the LDEV within the virtual storage system capable of being identified by the host computer is called a global device (hereinafter referred to as "GDEV"). A global device number (GDEV number) assigned to each global device (GDEV) is unique within the virtual storage system. Upon allocating a logical CU or a GDEV to the virtual storage system, if there is no consideration on the allocation destination storage systems, the logical CU of the logical path destination and the access target GDEV may be separated in different storage systems.

If logical CUs having identical numbers are allocated to multiple storage systems, and logical paths to these multiple storage systems are established, the MF host computer will use these logical paths equivalently, so that a logical CU not belonging to the storage system to which the access target GDEV is allocated may receive the I/O request. When the storage system having received the I/O request transfers the I/O request to the storage system having the access target GDEV allocated thereto, the I/O performance may be deteriorated if the bandwidth between storage systems is narrow or if the storage systems are not directly connected.

Therefore, the present invention aims at improving a data access performance from the host computer to the GDEV of the virtual storage system by allocating logical CUs and GDEVs to the storage system so as to reduce data transfer within the virtual storage system.

Solution to Problem

In order to solve the problems, the present invention provides a scale-out type storage system provided as a single virtual storage system having multiple physical storage systems as components, wherein during allocation of GDEVs to the virtual storage system, if the logical CU being the destination of establishing a logical path accessing the GDEV is unallocated, the logical CU and the GDEV are generated in a storage system having either a small number of allocated logical CUs or a large amount of unused storage capacity. On the other hand, if there is a storage system to which the logical CU being the destination for establishing the logical path is already allocated, the GDEV is generated in that storage system. However, the present invention characterizes in that if there is not enough resource in the storage system, a volume is generated either by migrating a different logical CU having a low access frequency to a different storage system having sufficient resources or by adding a logical CU to a different storage system having sufficient communication bandwidth.

According to such configuration, the present invention enables to establish a logical path between the host computer and the virtual storage system so that input/output performance is not deteriorated.

Advantageous Effects of Invention

According to the present invention, a logical CU and a GDEV are allocated so as to reduce data transfer within the virtual storage system, to thereby improve the data access performance from the host computer to the GDEV of the virtual storage system.

BRIEF DESCRIPTION OF DRAWINGS

FIG. 3 is a view illustrating a configuration information of a virtual storage system according to the present invention.

FIG. 4 is a view illustrating a connection information of storage systems constituting the virtual storage system according to the present invention.

FIG. 5 is a view illustrating a logical CU allocation information of the virtual storage system according to the present invention.

FIG. 6 is a view illustrating a logical CU allocation information of the storage system according to the present invention.

FIG. 7 is a view illustrating a capacity management information of the storage system according to the present invention.

FIG. 8 is a view illustrating a logical CU access frequency management information of the storage system according to the present invention.

FIG. 9 is a view illustrating a configuration information of the storage system according to Embodiment 1.

FIG. 16 is a view illustrating a configuration example of a logical unit of the virtual storage system where path failure has occurred according to Embodiment 2.

FIG. 18 is a view illustrating a configuration information of a virtual storage system when path failure has occurred according to Embodiment 2.

DESCRIPTION OF EMBODIMENTS

Figure 1:
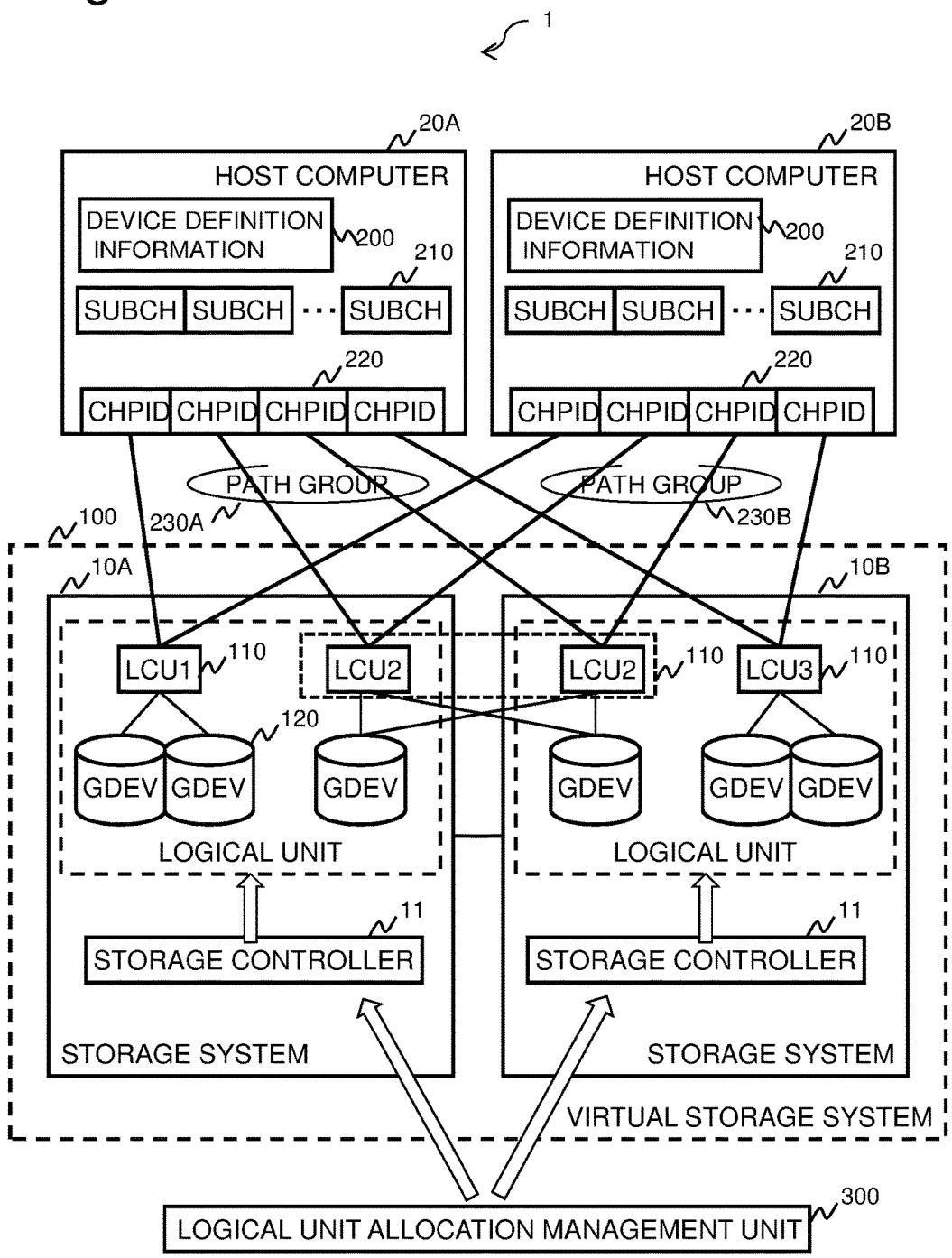
FIG. 1 is a block diagram illustrating an outline of a preferred embodiment of the present invention.

Now, the preferred embodiments of the present invention will be described with reference to the drawings.

Prior thereto, an outline of a basic function related to respective embodiments will be described with reference to a block diagram according to the present invention shown in FIG. 1. A computer system 1 is composed of a virtual storage system 100, a host computer 20 (such as a mainframe or a server), and a logical unit allocation management unit 300. The virtual storage system 100 is a logical device making resources of multiple storage systems 10 appear as though it is a single storage system to the host computer 20. In the following description, the virtual storage system is sometimes referred to as "VDKC" and the storage system is sometimes referred to as "RDKC".

In FIG. 1, the virtual storage system 100 is composed of a storage system 10A and a storage system 10B. The storage system 10 includes a storage controller 11, and controls a logical unit.

The logical unit includes a logical CU (LCU) 110 and a global device (GDEV) 120. The logical CU 110 is a unit for receiving a logical path from the host computer 20. The GDEV 120 is a volume recognized by the host computer 20, and a unique identifier within the virtual storage system 100 is assigned thereto.

The host computer 20 retains a device definition information 200, a sub-channel 210, and a channel path 220. The device definition information 200 defines the channel paths 220 of the host computer 20, the path connection configuration between logical CUs 110 of the virtual storage system 100, and all GDEVs 120 accessed by a logical path leading to the logical CU 110. For example, a maximum of eight channel paths 220 can be defined per host computer 20, a maximum of 256 logical CUs 110 can be defined per virtual storage subsystem 100, and a maximum of 256 GDEVs 120 can be defined per logical CU 110.

In a configuration where multiple host computers 20 are connected to the virtual storage system 100, the host computer 20 can register a path group 230 to the virtual storage system 100 so as to enable the logical path connecting to the host computer 20 on the virtual storage system 100 side to be identified. In FIG. 1, the LCU 2 of the logical CU 110 is connected to the host computer 20A and the host computer 20B, and the logical path from the host computer 20A is registered as path group 230A, and the logical path from the host computer 20B is registered as path group 230B. The communication between the host computer 20 and the virtual storage system 100 can utilize logical paths within the path group 230 in parallel.

The logical unit allocation management unit 300 manages multiple storage systems 10 and connections thereof, and instructs the storage controller 11 to either generate or delete a logical CU 110 and a GDEV 120. Further, it stores the logical units generated in each storage system 10.

As a result, I/O can be processed using a logical path where the path between the host computer 20 and the storage unit storing data is shortest, so that multiple small-scale storage systems 10 can be used to construct a high performance virtual storage system 100. Especially, in a scale-out storage having a large number of inexpensive storage systems 10 coupled, a storage area having superior cost performance can be provided to the user.

Embodiment 1

According to Embodiment 1, the logical unit allocation management unit 300 determines the logical CU 110 and the GDEV 120 to be allocated to the respective storage systems 10 based on the connections of the storage systems 10 being the component of the virtual storage system 100, and each storage system 10 generates the logical CU 110 and the GDEV 120 to process input/output requests from the host computer 20.

Figure 2:
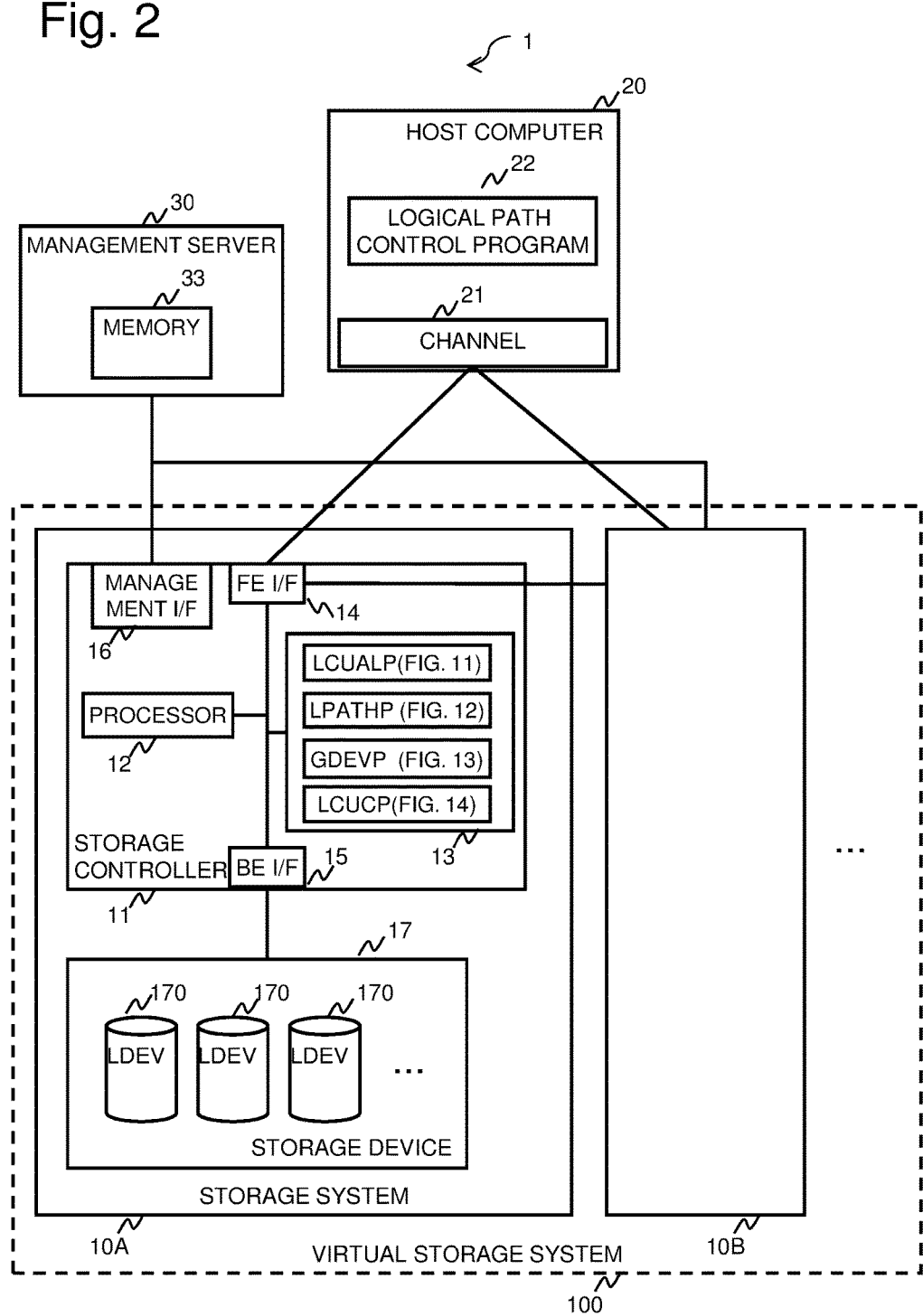
FIG. 2 is a block diagram illustrating a configuration of a computer system according to Embodiment 1.

FIG. 2 is a block diagram illustrating a configuration of a computer system according to Embodiment 1. The computer system 1 includes multiple storage systems 10, at least one host computer 20, and a management server 30.

The storage system 10 and the host computer 20, or the mutual storage systems 10 are connected via a network. When the host computer 20 is a mainframe (MF), channel commands and transfer data are communicated via the network.

The storage system 10 includes a storage controller 11 and a storage device 17. The storage device 17 is connected via a communication path to the controller 11.

The storage controller 11 is composed of a processor 12 and a memory 13, which is connected via a frontend interface (hereinafter, the interface is abbreviated as "I/F") 14 to the host computer 20 or a different storage system 10, connected via a backend I/F 15 to the storage device 17, and connected via a management I/F 16 to the management server 30.

The storage controller 11 controls the input/output processing of data to/from the storage device 17 based on a command received from the host computer 20. Further, a portion of the memory 13 is used as a buffer for input/output processing, according to which input/output processing can be completed in a shorter time than reading/writing data from/to the storage device 17. This buffer is called a cache.

The processor 12 controls the operation of the whole storage system 10. By having the processor 12 execute the programs stored in the memory 13, various processes can be performed by the whole storage system 10. The programs stored in the memory 13 include a logical CU allocation program, a logical path generation program, a GDEV management program and a logical CU information control program.

The storage device 17 includes logical devices (LDEVs) 170 composed of physical storage areas such as disk devices. The LDEV 170 is a storage destination of data of the GDEV 120.

The host computer 20 has a channel 21 which is a system dedicated to performing the input-output processing, and a logical path control program 22 for generating or deleting the logical path with the storage system 10. The channel 21 retains a sub-channel information 210 defined by the configuration definition information 200, and specifies the GDEV 120 accessed by the host computer 20.

Further, the host computer 20 executes various applications, and executes an input/output command when input/output of data is required, based on which the channel 21 issues an input/output command to the logical CU 110 as logical path destination accessing the GDEV 120 set as allocation destination of data, and receives a response data of input/output command from the storage system 10.

The management server 30 is equipped with a memory 33 for storing various tables related to the virtual storage system described below.

FIG. 3 shows an example of the configuration information of the virtual storage system according to the present invention. This is a table for managing the storage system 10 constituting the virtual storage system 100, which is stored in the memory 33 of the management server 30, and the respective entries are composed of a virtual storage system identifier 301, and storage system identifiers 302 through 305.

The virtual storage system identifier 301 stores a product number by which the host computer 20 specifies the virtual storage system 100, and the storage system identifiers 302 through 305 store identification information (storage system identifiers 1 through 4) of the storage system 10 which are configuration elements of the virtual storage system 100 shown by the virtual storage system identifier 301. FIG. 3 shows a management information of the virtual storage system 100 composed of a maximum of four storage systems 10, but the number of storage systems is not restricted thereto, and the number can be five or more, wherein in that case, the number of fields storing the storage system identifiers will be five or more.

FIG. 4 illustrates one example of a connection information of the storage system composing the virtual storage system according to the present invention. This table manages the information indicating the directly connected storage system 10 out of the storage systems 10 constituting the virtual storage system 100 and information indicating the mutual bandwidths, which is stored in the memory 33 of the management server 30. Storage system identifiers (storage system identifiers RDKC1 through RDKC4) stored in fields 302 through 305 of FIG. 3 are stored in storage system identifiers 402 through 405 in the row direction of the table and the storage system identifiers 412 through 415 in the column direction of the table. Information for managing the connections of the storage systems (information showing bandwidth in FIG. 4), such as whether storage systems are directly connected, is stored in the field where the row and the column of the fields storing the storage system identifier cross each other.

For example, the field 441 stores "middle bandwidth" indicating that the bandwidth between RDKC1 (field 402) and RDKC4 (field 415) is a middle level. Similarly, information indicating the bandwidth between RDKC2 (field 403) and RDKC4 (field 415) is stored in field 442, and information showing the bandwidth between RDKC3 (field 404) and RDKC4 (field 415) is stored in field 443. The field shown by "-" in FIG. 4 indicates that the field is not used because they are identical storage systems or the combination of storage systems is overlapped.

FIG. 5 illustrates one example of a logical CU allocation information of a virtual storage system according to the present invention. The illustrated table manages the allocation of each logical CU 110 of the virtual storage system 100 to the storage systems 10, which is stored in the memory 33 of the management server 30, and the entries of the table are composed of a virtual storage system identifier 501, a logical CU number 502, and storage system identifiers 503 through 505.

The virtual storage system identifier field 501 stores a product number used by the host computer 20 to specify the virtual storage system 100. The logical CU number field 502 stores the identification number of the logical CU. The storage system identifier fields 503 through 505 store identifiers of the storage system 10 to which the logical CU stored in field 502 is allocated.

The entry 511 shows that the logical CU number 1 of the virtual storage system identifier VDKC1 is allocated to the storage system identifier RDKC1. Similarly, entry 512 shows that the logical CU number 2 of the virtual storage system identifier VDKC1 is allocated to the storage system identifier RDKC2. Entry 513 shows that the logical CU number 1 of the virtual storage system identifier VDKC2 is allocated to storage system identifiers RDKC1 and RDKC2.

FIG. 5 shows that a maximum of three storage systems 10 can be allocated via a same virtual storage system identifier to a same logical CU number, but the number is not restricted thereto, and the number can be four or greater, wherein in that case, the number of fields storing the storage system identifier will be four or greater. The field storing "-" in FIG. 5 indicates that the field is not used since the number of storage systems to which the logical CU is allocated is three or smaller.

FIG. 6 illustrates one example of a logical CU allocation information of a storage system according to the present invention. The illustrated table manages the logical units of the virtual storage system 100 allocated to the storage system 10, which is stored in the memory 13 of each storage system 10, and the entries of the table are composed of a virtual storage system identifier 601, a logical CU number 602, a GDEV number 603, a storage system identifier 604, an LDEV number 605 and a capacity 606.

The LDEV having an LDEV number shown in field 605 stores data existing in a virtual storage system identifier shown in field 601, having a logical CU number shown in field 602, and in a GDEV having a GDEV number shown in field 603. The capacity of field 606 stores the capacity of the GDEV shown in field 603.

The "-" stored in field 604 indicates that the GDEV is allocated within the storage system 10 storing this information. On the other hand, when a storage system identifier is stored in the field 604, it means that the GDEV data is stored in an LDEV of a different storage system shown in field 604. In that case, information stored in fields 605 and 606 are managed by the storage system in field 604, so that the fields are not used and "-" is stored therein.

FIG. 7 illustrates one example of a capacity management information of a storage system according to the present invention. The upper limit of the data storage capacity of the virtual storage system 100 shown by virtual storage system identifier 701 is stored in field 702. In the storage system 10 retaining this capacity management information as a table in the memory 13, during the allocation of a new LDEV area for writing the data of the GDEV 120, if the total capacity of the area allocated for the virtual storage system 100 to which the GDEV 120 belongs exceeds the value stored in field 702, the writing of data is suppressed.

FIG. 8 illustrates one example of a logical CU access frequency management information of the storage system according to the present invention. The illustrated table manages the logical unit of the virtual storage system 100 allocated to the storage system 10, which is stored in the memory 13 of each storage system 10, and the entries of the table are composed of a virtual storage system identifier field 801, a logical CU number field 802, a GDEV number field 803, a storage system identifier field 804, an access number field 805, and an access number measurement period field 806.

Field 805 stores the number of times of accesses to the data in the GDEV stored in the GDEV number field 803 of the logical CU stored in the logical CU number field 802 of the virtual storage system 100 stored in the virtual storage system identifier field 801. Field 806 stores the period of time during which the number of accesses shown in field 805 is measured. When "-" is stored in field 804, it means that the GDEV is allocated to the storage system 10 storing this information. On the other hand, when a storage system identifier is stored in the field 804, it means that the GDEV data is stored in the LDEV of a different storage system shown in field 804. In that case, the information in fields 805 and 806 are managed by the storage system shown in field 804, so that the fields are not used and "-" is entered.

FIG. 9 illustrates one example of a configuration information of the storage system according to the present invention. The illustrated table manages the storage systems 10 included in the computer system 1, which is stored in the memory 13 of each storage system 10, and the entries are composed of a storage system identifier field 901, a storage capacity field 902, a processor performance field 903, and a cache capacity field 904.

The storage system identifier field 901 stores the product number for specifying the storage system 10. The storage capacity field 902 stores the size of the storage device 17 of the storage system 10 shown in field 901. The processor performance field 903 stores the clock number or the core number indicating the processor performance. The cache capacity field 904 stores the cache size.

Figure 10:
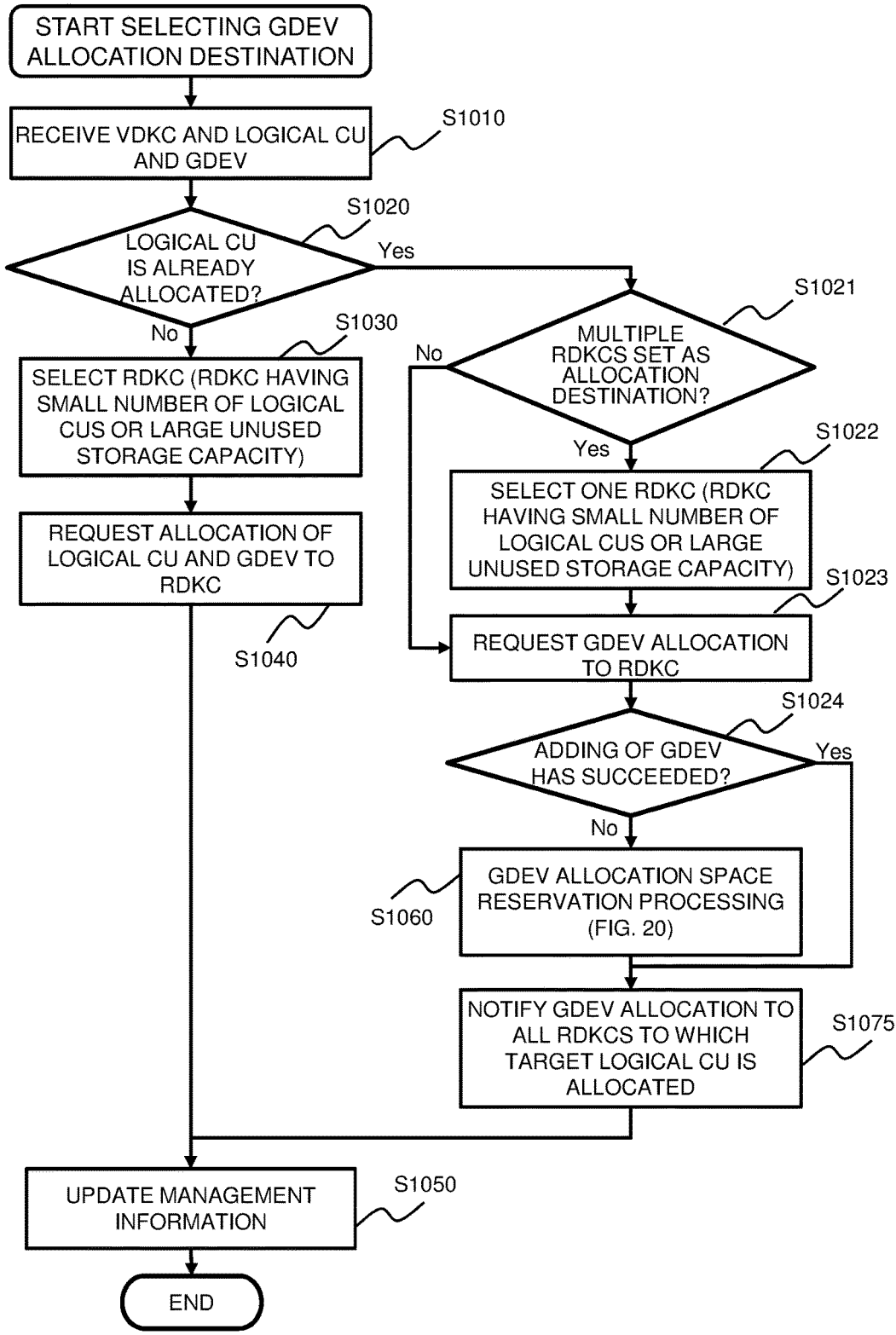
FIG. 10 is a flowchart illustrating a process for selecting a GDEV allocation destination according to Embodiment 1 of the present invention.

FIG. 10 is a flowchart illustrating the steps of the process for selecting a GDEV allocation destination according to Embodiment 1. In the GDEV allocation destination selecting process, a storage system 10 for allocating a GDEV 120 of the virtual storage system 100 is selected in the logical unit allocation management unit 300.

At first, in step S1010, when a GDEV allocation request to a management server 30 is received from an administrator or the like, the logical unit allocation management unit 300 receives a virtual storage system identifier VDKC, a logical CU number and a GDEV number.

Next, in step S1020, the logical unit allocation management unit 300 determines whether the received logical CU number is already allocated to a virtual storage system or not using the logical CU allocation information of the virtual storage system of FIG. 5. The target logical CU can be determined as already allocated when the target VDKC is stored in the virtual storage system identifier field 501, an entry storing the target logical CU exists in the logical CU number field 502, and the storage system identifier is stored in any one of the fields 503 through 505.

In step S1020, when the logical unit allocation management unit 300 determines that the target logical CU is not already allocated (No), then in step S1030, it executes a process to select the storage system RDKC having either a small number of already-allocated logical CUs or a large amount of unused storage capacity. In order to do so, first of all, regarding the number of logical CUs, the logical CU allocation information of the virtual storage system of FIG. 5 is used to select the RDKC having the smallest number of storage system identifiers stored in fields 503 through 505 of the entries related to the target VDKC. Further, regarding the unused storage capacity, the logical CU allocation information of the storage system of FIG. 6 stored in each RDKC is used to select the RDKC having the smallest capacity allocation as the capacity of the GDEV in the field 606 of the entry related to the target VDKC.

Next, in step S1040, the logical unit allocation management unit 300 requests to allocate a logical CU of the VDKC and the GDEV to the storage system RDKC selected in the previous step S1030. The RDKC having received the request of step S1040 executes the logical CU allocation processing program LCUAP. The RDKC having received the request of step S1040 executes the logical CU allocation processing program LCUAP illustrated in FIG. 11. This logical CU allocation processing program LCUAP will be described in detail later.

Thereafter, when the logical unit allocation management unit 300 receives a notice that the allocation of the logical CU and the GDEV has succeeded from the storage system RDKC having executed the above allocation processing, in step S1050, it updates the logical CU allocation information of the virtual storage system of FIG. 5. In the present step, a VDKC entry is added to the field 501, a target logical CU number is stored in the field 502, and the target RDKC is stored in the field 503. If the allocation of the logical CU and the GDEV has failed in the storage system RDKC having executed the above allocation processing, the logical unit allocation management unit 300 re-selects a different RDKC in step S1030, and executes S1040.

On the other hand, when the logical unit allocation management unit 300 determines that the target CU is already allocated in step S1020 (Yes), it determines whether there are multiple allocation destination storage systems RDKC or not in step S1021. The logical CU allocation information of the virtual storage system of FIG. 5 is used for this determination. That is, if the target VDKC is stored in the virtual storage system identifier field 501, there is an entry in which the target logical CU is stored in the logical CU number field 502, and at least two storage system RDKC identifiers are stored in fields 503 through 505, it can be determined that the target logical CU is already allocated to multiple storage system RDKCs.

When it is determined in step S1021 that the target logical CU is not allocated to multiple storage system RDKCs (No), then in step S1023, the logical unit allocation management unit 300 requests additional allocation of GDEV to the storage system RDKC to which the target logical CU is already allocated.

On the other hand, when the logical unit allocation management unit 300 determines in step S1021 that there are multiple allocation destination RDKCs of the target logical CU, then in step S1022, it executes a process to select a storage system RDKC having either a small number of allocated logical CUs or a large unused storage capacity. Regarding the number of logical CUs, the numbers of entries in which the storage system identifier stored in fields 503 through 505 storing the target VDKC and the logical CU number is stored in fields 503 through 505 of a different entry are compared using the logical CU allocation information of the virtual storage system of FIG. 5, and the RDKC having the smallest number is selected. Further, regarding the unused storage capacity, the logical CU allocation information of the storage system of FIG. 6 stored in each storage system RDKC is used to select an RDKC having the smallest capacity allocation as the capacity of the GDEV in the field 606 of the entry storing the target VDKC and logical CU number.

Thereafter, the logical unit allocation management unit 300 executes the above-described step S1023, receives the result of the GDEV allocation from the storage system RDKC, wherein when the allocation of GDEV in step S1023 fails, and if there are other allocation destinations of the logical CU, it repeats steps S1022 and S1023.

Next, in step S1024, the logical unit allocation management unit 300 judges whether a new GDEV had been added to the storage system RDKC having the logical CU already allocated thereto. When the adding of GDEV has succeeded (Yes), in step S1075, a notice is sent to all storage systems 10 to which the target logical CU is allocated that the target GDEV of the target logical CU has been allocated to the selected RDKC. The storage system 10 having received the notice of step S1075 adds an entry to the logical CU allocation information of the storage system of FIG. 6, and stores the VDKC in field 601, the target logical CU number in field 602, the target GDEV number in field 603, and the RDKC in field 604. Thereafter, the logical unit allocation management unit 300 updates the management information in step S1050, and ends the process.

On the other hand, when it is determined in step S1024 that the allocation of GDEV has failed (No), then in step S1060, the logical unit allocation management unit 300 executes a GDEV allocation space reservation process.

Figure 20:
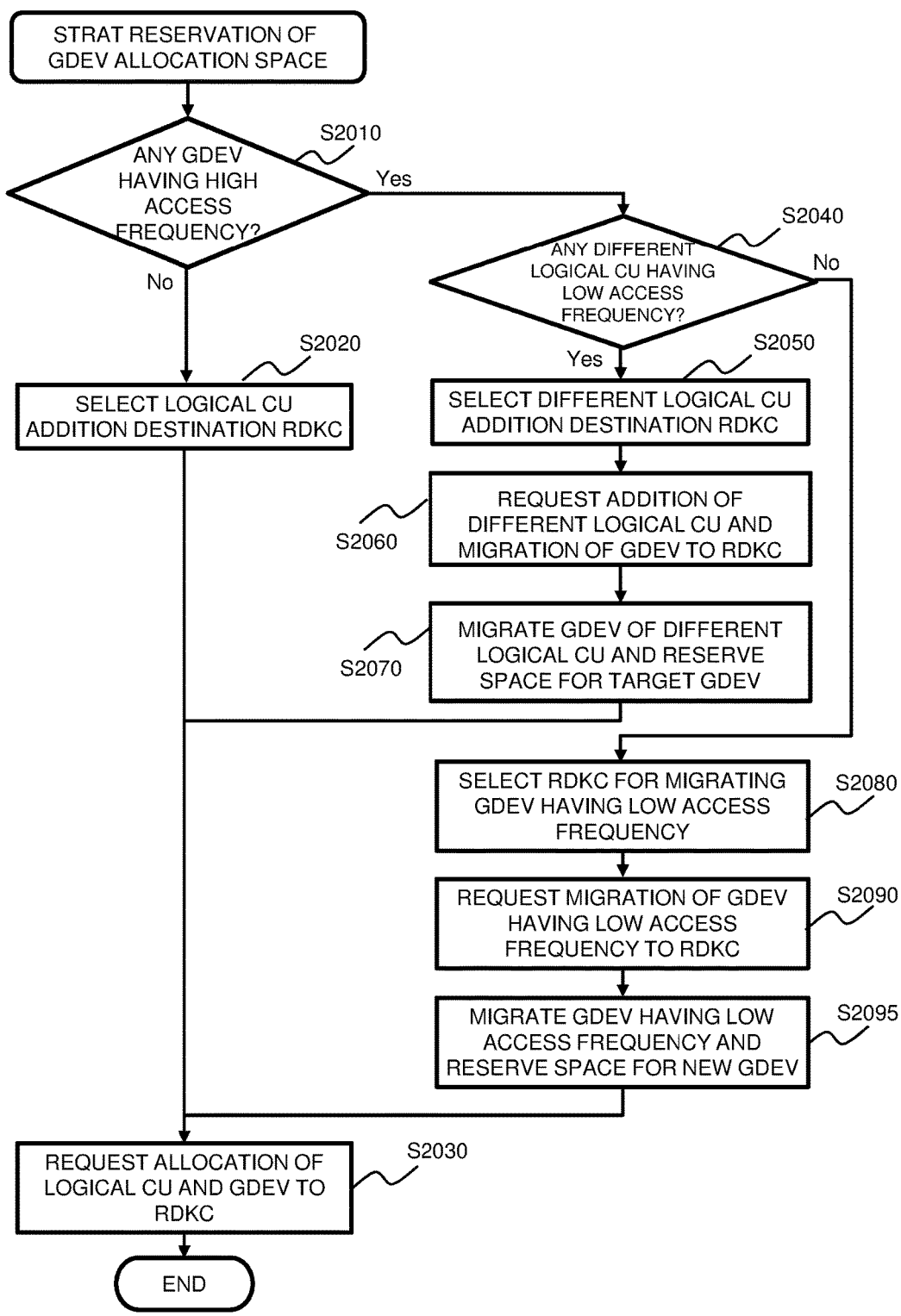
FIG. 20 is a flowchart illustrating a GDEV allocation space reservation process in a process for selecting a GDEV allocation destination according to FIG. 10.

The flow of the GDEV allocation space reservation process of step S1060 will be described with reference to FIG. 20.

In step S2010, the logical unit allocation management unit 300 inquires whether there is a GDEV having a high access frequency to the storage system RDKC to which the target logical CU is allocated. The RDKC having received this inquiry determines, using the logical CU access frequency management information of the storage system of FIG. 8, whether the access frequency shown in fields 805 and 806 regarding the entry where the target VDKC is stored in field 801 and the target logical CU is stored in field 802 exceeds a predetermined threshold or not.

When it is determined in step S2010 that there is no storage system RDKC to which a GDEV having a high access frequency is allocated (No), the logical unit allocation management unit 300 selects an RDKC to which the logical CU is to be added in step S2020. Since there is no GDEV having a high access frequency, it is assumed that the occurrence of transfer of I/O requests between storage systems caused by the allocation of logical CU across multiple RDKCs is permitted, and an RDKC to which the logical CU is to be allocated is newly added. Also in this case, for example, an RDKC having a small number of allocated logical CUs of the VDKC is selected.

It is also possible to select an RDKC having a high bandwidth with the RDKC already allocated to the VDKC, by using the connection information of the storage system constituting the virtual storage system of FIG. 4. For example, when the VDKC is allocated to RDKC1 and RDKC2, and RDKC3 and RDKC4 are selectable as the additional RDKC, it is possible to select RDKC3 out of these two RDKCs since it has a high bandwidth with RDKC1 and RDKC2.

Thereafter, in step S2030, the logical unit allocation management unit 300 requests addition of logical CU and allocation of GDEV to the storage system RDKC selected in the previous step S2020.

On the other hand, when it is determined in step S2010 that there is a GDEV having a high access frequency (Yes), the logical unit allocation management unit 300 determines in step S2040 whether there is a different logical CU having only a low access frequency GDEV allocated to the RDKC or not.

When the logical unit allocation management unit 300 determines that there is a different logical CU having a low access frequency (Yes), then in step S2050, it selects an addition destination RDKC for migrating the GDEV of the different logical CU. Here, the unit determines that the performance request of the GDEV allocated to the different logical CU is not high, and reserves space for the allocation target GDEV by allocating the different logical CU in a distributed manner to multiple RDKCs and moving the GDEV to a different RDKC.

Next, in step S2060, the logical unit allocation management unit 300 requests to add the different logical CU and to migrate the GDEV to the addition destination RDKC, and migrates the GDEV of the different logical CU in step S2070 to clear the space for the allocation target GDEV.

On the other hand, in step S2040, when the logical unit allocation management unit 300 determines that there is no different logical CU having a low access frequency (No), then in step S2080, it selects a GDEV having a low access frequency within the allocation target logical CU and a migration destination RDKC. This step is to ensure space for the allocation target GDEV by migrating a GDEV having a low access frequency to a different RDKC and setting the same as an external connection volume.

In the present step, access frequency information is received from the RDKC having the target logical CU already allocated thereto, and the GDEV having the smallest access frequency is set as the migration target. As for the migration destination, for example, an RDKC having a small number of allocated logical CUs or a total capacity information of the allocated GDEV is received from the RDKC, and the RDKC having the smallest allocation capacity is selected.

Next, in step S2090, the logical unit allocation management unit 300 requests migration of a GDEV having a small access frequency to the selected RDKC, and in step S2095, it requests migration of the GDEV to a migration source RDKC having the GDEV with a small access frequency, to thereby clear the space for the allocation target GDEV.

When the GDEV allocation space is ensured in this manner, then in step S2030, the logical unit allocation management unit 300 requests allocation of the logical CU and the GDEV to the RDKC in which space has been reserved.

Based on the above process, it becomes possible to select a storage system 10 to which the GDEV 120 of the virtual storage system 100 will be allocated.

Figure 11:
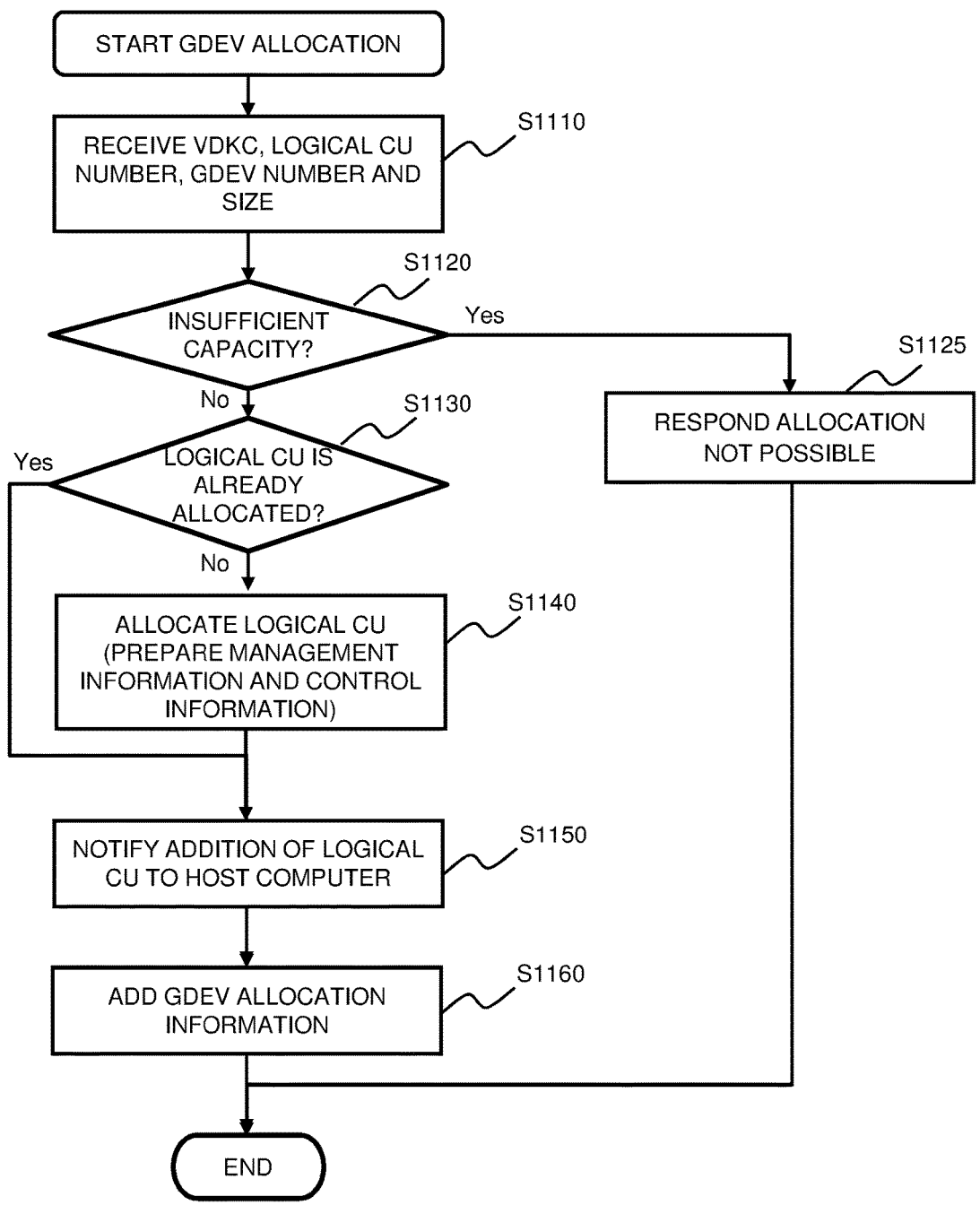
FIG. 11 is a flowchart illustrating a process for allocating a GDEV according to Embodiment 1.

FIG. 11 is a flowchart illustrating a GDEV allocation process according to Embodiment 1. This is a process performed based on a logical CU allocation program LCUALP (FIG. 2), which is started when the storage controller 11 of the storage system 10 receives an allocation request of the logical CU 110 from the logical unit allocation management unit 300.

At first, in step S1110, the storage controller 11 receives the virtual storage system identifier VDKC, the logical CU number, the GDEV number, and the size to be allocated to the GDEV from the logical unit allocation management unit 300.

Next, in step S1120, the storage controller 11 determines whether the addition of the given size causes insufficiency of capacity allocated to the VDKC or not. In this step, the logical CU allocation information of the storage system of FIG. 6 and the capacity management information of the storage system of FIG. 7 are used. The storage controller 11 adds the capacity in the field 606 of the entry where the target VDKC is stored in the field 601, and determines whether the value having added the given size to the capacity exceeds the upper limit in the field 702 of the entry where the target VDKC is stored in the field 701.

When the storage controller 11 determines in step S1120 that the capacity is exceeded, in other words, that there is insufficient capacity (Yes), then in step S1125, it returns to the request source that the GDEV cannot be allocated, and ends the process.

On the other hand, when the storage controller 11 determines in step S1120 that the capacity is not exceeded, in other words, that there is no insufficient capacity (No), then in the following step S1130, it determines whether the target logical CU is already allocated to the storage system 10 or not. In this step, the storage controller 11 uses the logical CU allocation information in the storage system of FIG. 6 to check whether or not the target logical CU number is stored in the field 602 of the entry where the target VDKC is stored in the field 601.

In step S1130, when the storage controller 11 determines that the logical CU is already allocated (Yes), then in step S1160, it allocates the target GDEV to the LDEV 170, adds the entry of the target VDKC to the storage system logical CU allocation information in FIG. 6, and stores the target logical CU number in field 602, the target GDEV number in field 603, the allocation destination LDEV number in field 605, and the size of the target GDEV in field 606.

On the other hand, when the storage controller 11 determines that the logical CU is unallocated (No) in step S1130, then, in step S1140, it allocates the target logical CU. In the present case, it adds an entry to the logical CU allocation information in the storage system of FIG. 6, and stores the target VDKC in field 601 and the target logical CU number in field 602. Further, the logical CU 110 is designed to manage the control information showing how the cache is used or the operation state thereof, so that the storage controller 11 allocates the area for storing the control information in the memory 13 or the LDEV 170.

Next, in step S1150, the storage controller 11 notifies the host computer 20 that a logical path can be added to the logical CU of the VDKC. Here, for example, a control unit initiated reconfiguration (CUIR) function is used. The host compute 20 having recognized that a path to the logical CU can be added can execute a command to validate a new logical path to a logical CU using the logical path control program 22 (FIG. 2).

Finally in step S1160, the storage controller 11 executes additional storage of allocation information of the above GDEV, and ends the process.

The above described process enables the logical CU 110 and the GDEV 120 to be allocated to the storage system 10.

Figure 12:
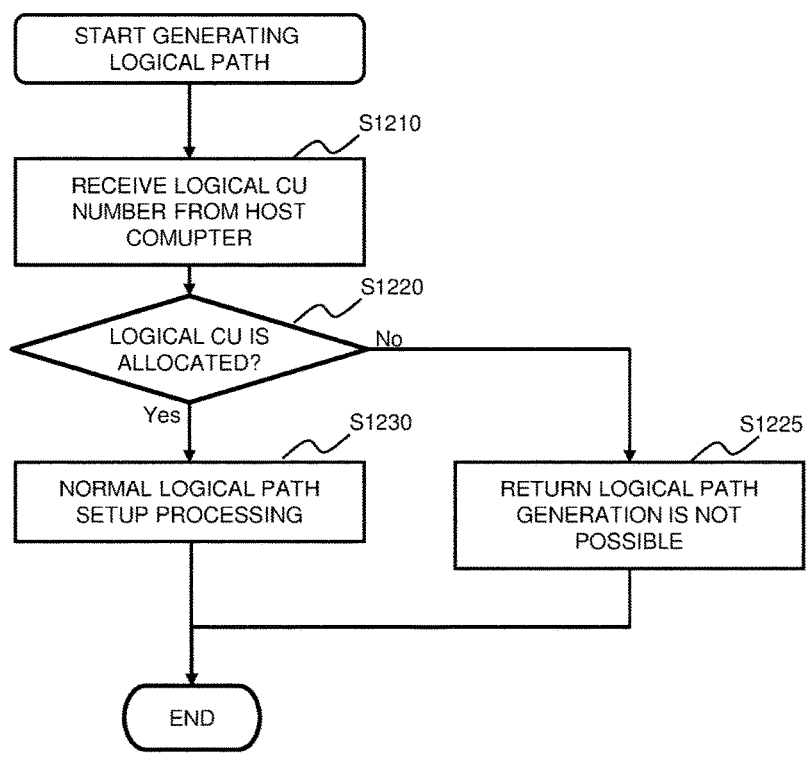
FIG. 12 is a flowchart illustrating a process performed when a logical path generation request is received according to Embodiment 1.

FIG. 12 is a flowchart illustrating a process flow performed when a logical path generation request according to Embodiment 1 is received. This is a process of a logical path generation program LPATHP (FIG. 2 and FIG. 19), which is started when the storage controller 11 of the storage system 10 receives a logical path generation request from the host computer 20 to the logical CU 110.

At first, in step S1210, the storage controller 11 receives a virtual storage system identifier and a logical CU number for generating a logical path from the host computer 20.

Next, in step S1220, the storage controller 11 determines whether or not the logical CU number of the target virtual storage system identifier is allocated to itself or not.

When it is determined that the target logical CU is not allocated (No) in step S1220, the storage controller 11 responds to the host computer 20 that a logical path cannot be generated in step S1225.

On the other hand, when it is determined that the target logical CU is allocated thereto (Yes) in step S1220, the storage controller 11 processes a normal logical path setting in step S1230.

As described, a logical path can be generated only when a logical CU of the virtual storage system is allocated to the storage system 10.

Figure 13:
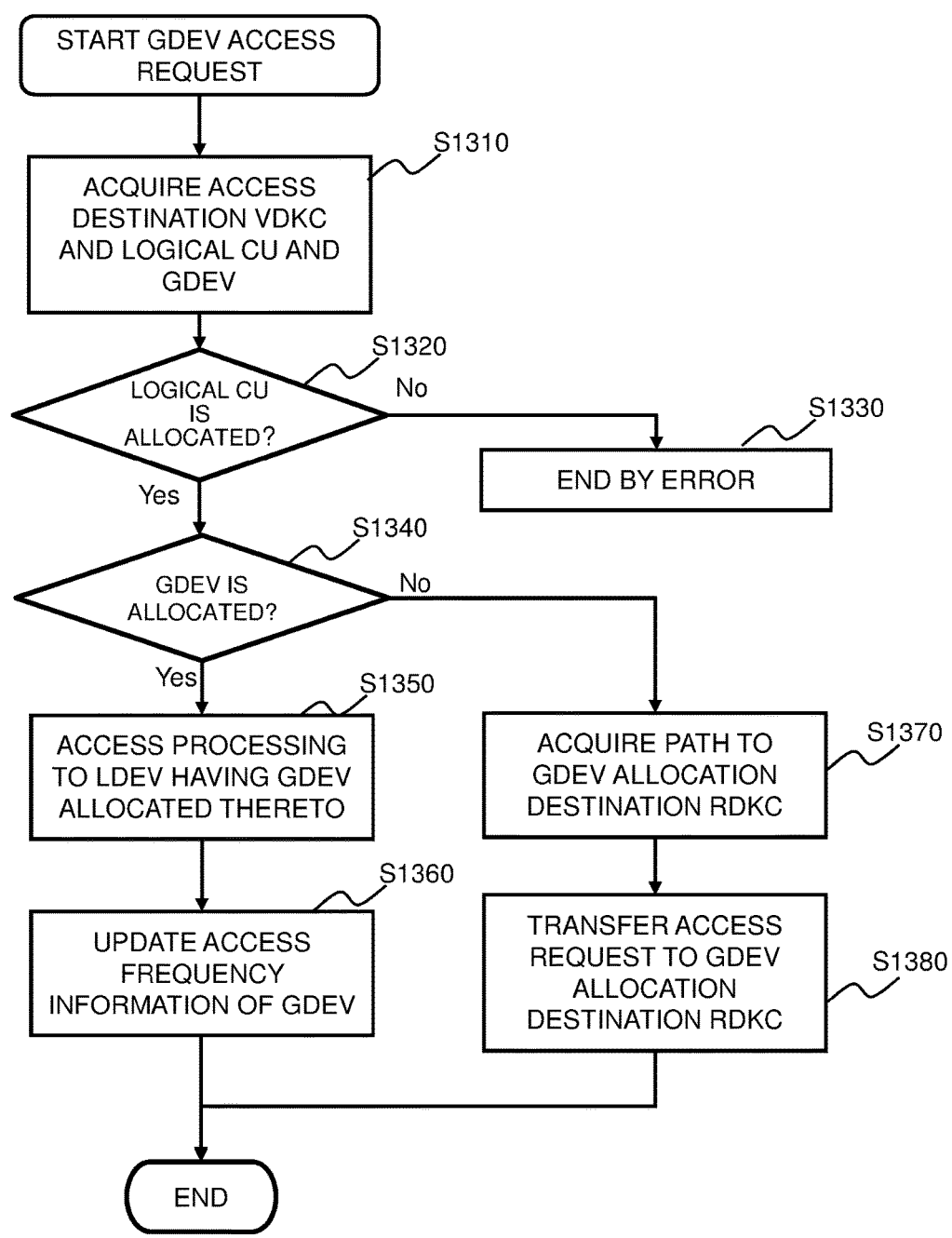
FIG. 13 is a flowchart illustrating a process performed when the storage system receives an access request according to Embodiment 1.

FIG. 13 is a flowchart illustrating the processes performed when the storage system 10 receives an access request according to Embodiment 1. This is a process performed by the GDEV management program GDEVP (FIG. 2 and FIG. 19), which is started when the storage controller 11 of the storage system 10 receives an input/output request from the host computer 20 to the GDEV 120.

At first, in step S1310, the storage controller 11 having received an input/output request to the GDEV 120 acquires a virtual storage system identifier, a logical CU number and a GDEV number of the access destination of the input/output request.

Thereafter, in step S1320, the storage controller 11 determines whether the logical CU being the target of the input/output request is allocated to the storage system 10 or not.

When it is determined that the target logical CU is not allocated (No) in step S1320, the storage controller 11 returns an input/output error to the host computer 20 in step S1330. Here, the storage controller 11 sends to the host computer a device status byte indicating detection of a device abnormality status caused by the logical CU not being allocated, and ends the GDEV access request processing.

On the other hand, when it is determined that the target logical CU is allocated (Yes) in step S1320, then in the following step S1340, the storage controller 11 determines whether the target GDEV is allocated or not. Here, the logical CU allocation information of the storage system of FIG. 6 is used. When the VDKC is stored in field 601, the target logical CU number is stored in field 602, the target GDEV number is stored in field 603, and the allocation destination LDEV number is stored in field 605, the storage controller 11 determines that the target GDEV is allocated.

When it is determined in step S1340 that the target GDEV is allocated (Yes), the storage controller 11 accesses the allocation destination LDEV of the target GDEV in step S1350.

Thereafter, in step S1360, the storage controller 11 updates the target GDEV entry field 805 (number of accesses) of the logical CU access frequency management information of the storage system in FIG. 8.

On the other hand, when it is determined in step S1340 that the target GDEV is not allocated (No), the storage controller 11 acquires a path to the storage system 10 (RDKC) to which the target GDEV is allocated in step S1370. Here, the storage system 10 stored in the target GDEV entry field 604 (storage system identifier) in the logical CU allocation information of the storage system of FIG. 6 is acquired.

Next, in step S1380, the storage controller 11 sends an input/output request to the storage system 10 (RDKC) to which the target GDEV is allocated. The input/output request mentioned here refers to a GDEV access request command including a path group information and the information acquired in step S1310.

A command is transmitted from the RDKC having received the input/output request to the RDKC to which the GDEV is allocated, and the RDKC to which the GDEV is allocated responds directly to the host. When the RDKC directly responds to the host, it sends an access result to the channel 21 using a vacant logical path within the path group 230.

On the other hand, when there is no logical path of the path group 230 in the RDKC to which the GDEV is allocated, the RDKC having received the input/output request accesses the GDEV, and responds the access result to the host. In that case, the response is returned to the host via the same RDKC through which the input/output request had passed, tracking the incoming route of the input/output request backwards.

According to the above process, it becomes possible to process the access request to the GDEV via the storage system 10 to which the target GDEV has been allocated.

Figure 14:
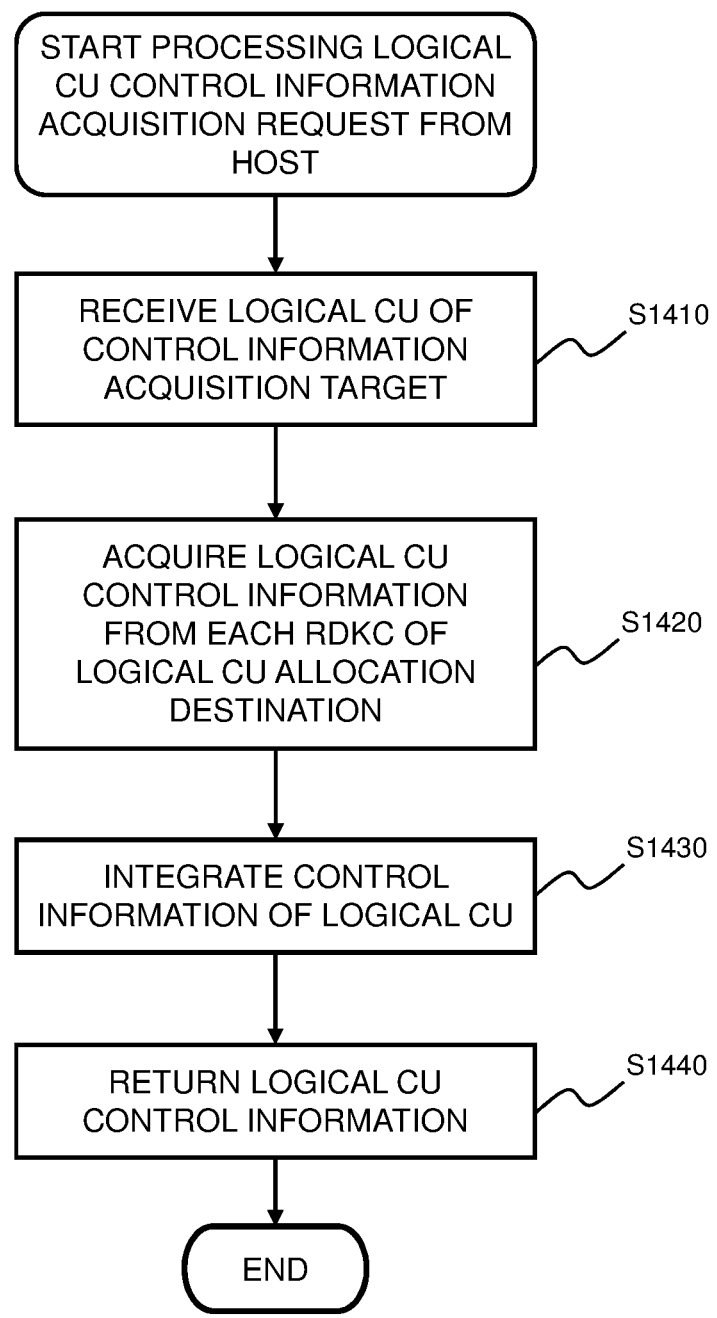
FIG. 14 is a flowchart illustrating a process performed when a logical CU control information acquisition request is received according to Embodiment 1.

FIG. 14 is a flowchart illustrating a process performed when a logical CU control information acquisition request according to Embodiment 1 has been received. This is a process performed by the logical CU information control program LCUCP (FIG. 2), which is started when the storage controller 11 of the storage system 10 receives a control information acquisition request of the logical CU 110 from the host computer 20. A control information acquisition request can be, for example, a READ SYSTEM DATA command.

At first, in step S1410, the storage controller 11 receives a control information acquisition target logical CU number from the host computer 20.

Thereafter, in step S1420, the storage controller 11 acquires a control information of the target logical CU from the respective storage systems 10 being the destination of allocation of the target logical CU. Here, the storage controller 11 uses the logical CU allocation information of the storage system of FIG. 6 to acquire different storage systems 10 to which the target logical CU is allocated, and transmits the logical CU information acquisition request to all those storage systems 10.

Thereafter, in step S1430, the storage controller 11 integrates all the target logical CU control information acquired from the respective storage systems 10. Here, "integrate" refers to adding an operation management information of the logical CU acquired from the respective storage systems 10, for example.

Lastly, in step S1440, the storage controller 11 returns the integrated logical CU control information to the host computer 20, and ends the process.

Based on the above process, the storage controller 11 can hand over the control information of the logical CU allocated to multiple storage systems 10 as a control information of a single logical CU of the virtual storage system to the host computer 20.

Figure 15:
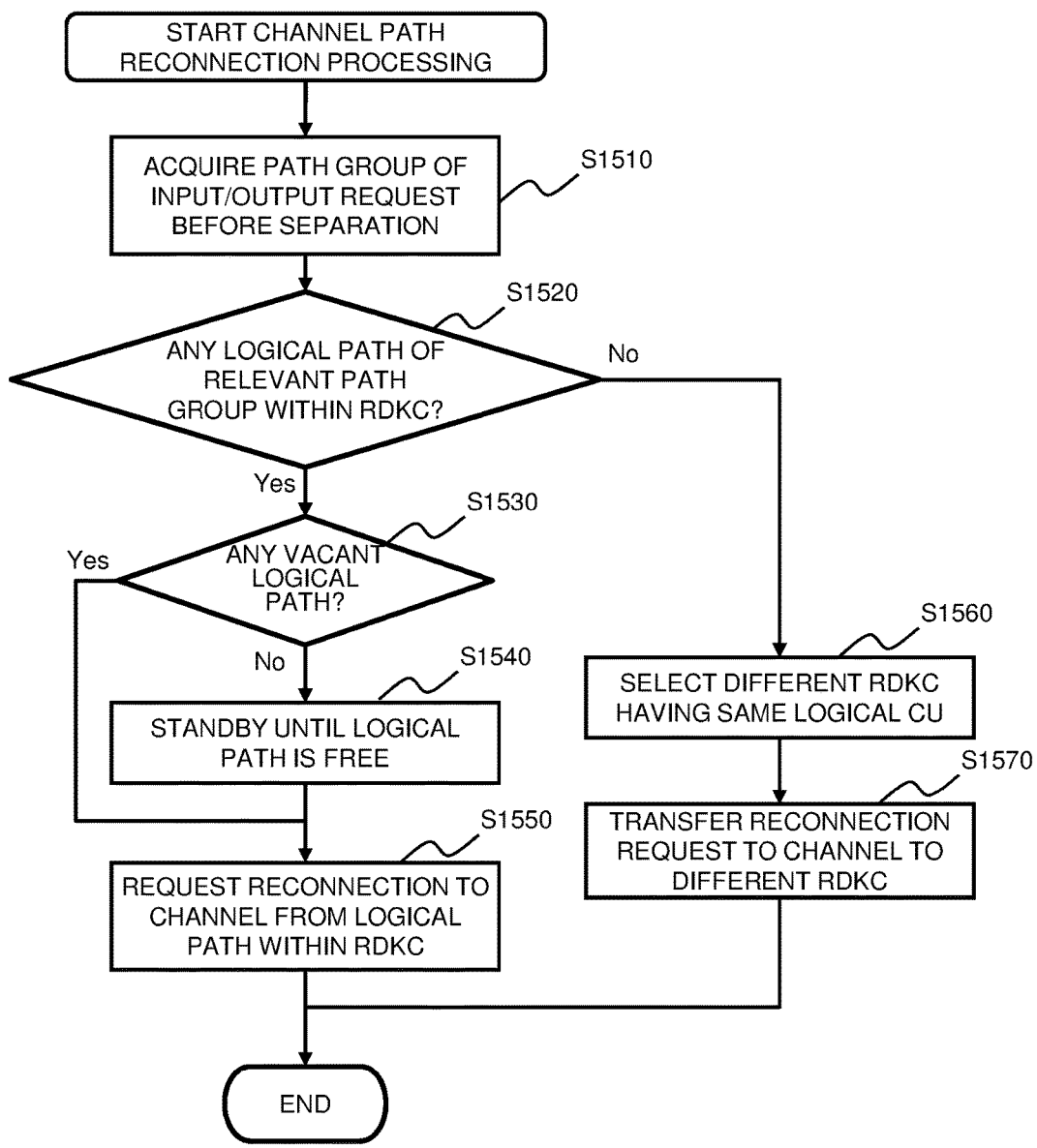
FIG. 15 is a flowchart illustrating a channel path reconnection process according to Embodiment 1.

FIG. 15 is a flowchart illustrating a channel path reconnection process according to Embodiment 1. A channel path reconnection is a function for temporarily disconnecting a logical path during execution of a command chain based on an input/output command from a host computer or mainframe (MF), and when performing the next reconnection, reconnecting an arbitrary logical path within the same path group 230 including the logical path issuing the command, to thereby enable continuation of the command chain.

For example, when rotational delay of the disk is completed, reconnection with the channel 21 is enabled as long as at least one logical path within the path group 230 is not active, and the processing of the subsequent command can be started, so that the time required to complete the input/output can be shortened.

At first, in step S1510, the host computer 20 acquires a path group 230 of the logical path prior to disconnection. In the example, it is assumed that the information on the path group 230 of the input/output request being disconnected is retained by the storage system 10.

Thereafter, in step S1520, the host computer 20 determines whether or not a logical path of the path group 230 acquired in the previous step S1510 is set in the storage system 10 performing this process.

When it is determined in step S1520 that there are logical paths of the path group 230 (Yes), the host computer 20 determined whether there is a vacant path within the logical paths or not in step S1530.

When it is determined in step S1530 that there is a vacant logical path (Yes), the host computer 20 sends a reconnection request to the channel 21 using the logical path from the storage system 10 performing the process in step S1550.

On the other hand, when the host computer 20 determines that there is no vacant logical path (No) in step S1530, it waits until any one of the logical paths of the path group 230 is freed in step S1540, and when there is a free logical path, it executes step S1550.

Further, when it is determined in step S1520 that there is no logical path of the path group 230 in the storage system 10 (No), in step S1560, the host computer 20 selects a different storage system 10 (RDKC) having the logical path of the same path group 230.

Thereafter, in step S1570, the host computer 20 sends a channel path reconnection request to the different storage system 10 (RDKC) selected in the previous step S1560. Here, if the host computer 20 receives a notice of failure of channel path reconnection from the different storage system 10 (RDKC), it selects another different storage system 10 (RDKC) in step S1560, and repeats step S1570.

As described, during channel path reconnection of the virtual storage system 100, the host computer 20 can reduce the time required to start processing the subsequent command by performing reconnection via a logical path of the storage system 10 to which the access destination GDEV 120 is allocated, instead of via a logical path of the storage system 10 having received the input/output request.

As described, according to Embodiment 1, a virtual storage system can be composed of multiple storage systems, and the logical CU and GDEV of the virtual storage system can be allocated so as to reduce the amount of data transfer within the virtual storage system and enable access from the host computer.

Embodiment 2

Embodiment 2 is an example capable of preventing deterioration of input/output performance of the virtual storage system when a path failure occurs between storage systems in a computer system configuration according to Embodiment 1 or Embodiment 4 described later.

FIG. 16 is a view illustrating an example of a logical configuration of a virtual storage system where path failure has occurred according to Embodiment 2. In this example, it is assumed that RDKC1 through RDKC4 constitute a virtual storage VDKC2.

A configuration example (a) during normal state indicates that a logical CU2 is allocated to RDKC1 and RDKC2 from the host computer. When the access destination GDEV of the input/output request received by RDKC1 is in RDKC2, the input/output request is transferred from RDKC1 to RDKC2.

A configuration example (b) during path failure indicates that a failure has occurred in the path between RDKC1 and RDKC2, so that the input/output request received by RDKC1 is transferred via RDKC3 to the RDKC2 where the access destination GDEV exists. In that case, the RDKC1 selects either the RDKC3 or the RDKC4 connected to RDKC1, and requests the selected RDKC3 to transfer the request to the GDEV of the logical CU2 of RDKC2. The RDKC3 having received the transfer of request from RDKC1 to RDKC2 transfers the request to the RDKC2 if RDKC3 is directly connected to the transfer destination RDKC2. However, if RDKC2 is not directly connected thereto, it requests a sequential transfer of request to an RDKC that differs from the transfer source or the RDKC in the passed route, together with an RDKC identification information of the transfer source RDKC1 and the RDKC3 in the passed route.

A configuration example (c) after CU migration indicates migrating logical CU2 to RDKC3 and RDKC4, and receiving the input/output request via the logical paths thereof. A directly connected inter-RDKC path can be used from the logical CU2 to the RDKC1 or RDKC2 having the access destination GDEV.

Figure 17:
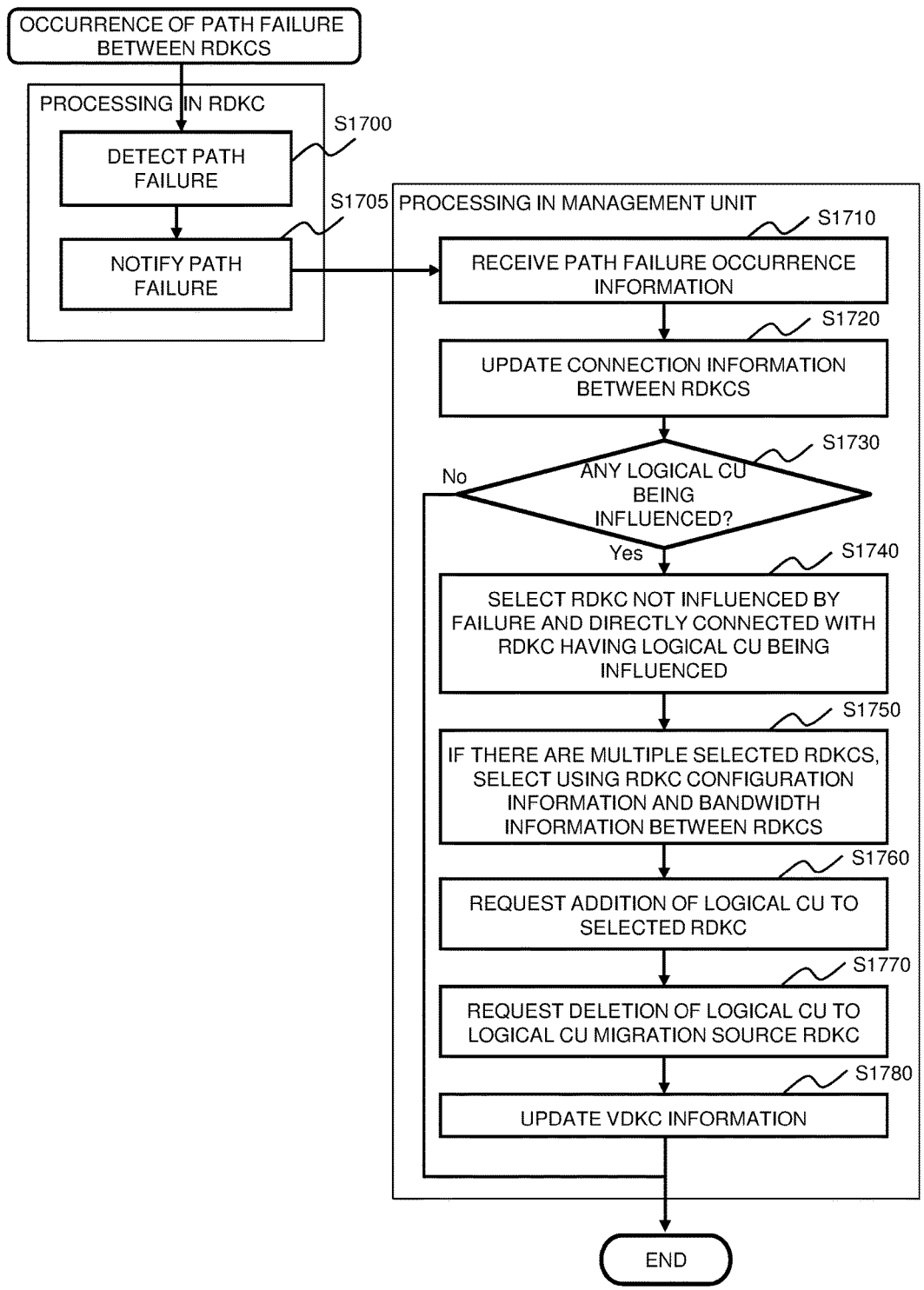
FIG. 17 is a flowchart illustrating a process performed when path failure between storage systems has occurred according to Embodiment 2.

FIG. 17 is a flowchart illustrating the process performed when a path failure occurs between storage systems (RDKCs) according to Embodiment 2.

At first, in step S1700, the storage system 10 detects path failure. Here, for example, RDKC1 of FIG. 16 detects path failure between RDKC2.

Thereafter, in step S1705, the RDKC1 notifies the logical unit allocation management unit 300 that a failure has occurred in the path between RDKC2.

In the following step S1710, the logical unit allocation management unit 300 receives this notice of path failure. The subsequent steps are processed in the logical unit allocation management unit 300.

Next, in step S1720, the logical unit allocation management unit 300 stores a path failure information in the connection information of the storage system composing the virtual storage system of FIG. 4. Here, in the case of a path failure between RDKC1 and RDKC2, the logical unit allocation management unit 300 updates the value in the field where the column of RDKC1 of field 402 crosses the row of RDKC2 of field 413 to information that indicates failure. As a result, the connection information of the storage system constituting the virtual storage system is changed to configuration information of the virtual storage system during path failure as illustrated in FIG. 18 (in the field shown by the broken line arrow from RDKC1 of field 402, the strike-through indicates that information has been changed).

Next, in step S1730, the logical unit allocation management unit 300 determines whether or not there is a logical CU influenced by the path failure between storage systems. Here, the logical unit allocation management unit 300 uses the logical CU allocation information of the virtual storage system according to FIG. 5 to determine whether the logical CU is generated to both storage systems connected by the path in which failure has occurred. Since entry 513 storing RDKC1 and RDKC2 exist in fields 503 through 505, based on the information stored in field 501 and 502, it is determined that the logical CU of logical CU number 2 of VDKC2 is influenced by the path failure.

In step S1730, if it is determined that there is no logical CU being influenced (No), the logical unit allocation management unit 300 ends the process.

On the other hand, when it is determined in step S1730 that there is a logical CU being influenced, then in step S1740, the logical unit allocation management unit 300 selects a storage system directly connected to the storage system having the logical CU being influenced and which is not influenced by the path failure. In the example of FIG. 18, it can be seen that two storage systems RDKC3 and RDKC4 are directly connected to RDKC1. Further, it can be seen that both RDKC3 and RDKC4 are also directly connected to RDKC2 having the logical CU of logical CU number 2 allocated thereto, so that these RDKCs are set as candidates of migration destination of the logical CU (the solid line arrow of FIG. 18 shows that RDKC3 is directly connected to RDKC1 and also directly connected to RDKC2).

Thereafter, in step S1750, the logical unit allocation management unit 300 determines the migration destination storage system of the logical CU of logical CU number 2 using the bandwidth information between storage systems. For example, the logical unit allocation management unit 300 determines to migrate the logical CU of logical CU number 2 located in RDKC1 to RDKC3 having a high bandwidth with RDKC1, and to migrate the logical CU of logical CU number 2 located in RDKC2 to the remaining RDKC4.

Thereafter, in step S1760, the logical unit allocation management unit 300 requests to add a logical CU to the migration destination storage system selected in the previous step S1750. The migration destination storage system having received the request adds the logical CU via the logical CU allocation processing program LCUALP (FIG. 2) (process of FIG. 11).

Further, in step S1770, the logical unit allocation management unit 300 requests to delete the logical CU to the storage system connected to the failure path. The migration source storage system receiving the request deletes the logical CU. For example, the RDKC1 deletes the logical CU of logical CU number 2, and change the field in which the logical CU number is "2" in the entry of VDKC2 in FIG. 6 and FIG. 8 to information indicating "2 (deleted)".

Next, in step S1780, the logical unit allocation management unit 300 updates the logical CU allocation information of the virtual storage system of FIG. 5. For example, the logical unit allocation management unit 300 deletes RDKC1 from the field 503 of entry 513 and stores RDKC3 in place thereof, and deletes RDKC2 from the field 504 of entry 513 and stores RDKC4 in place thereof.

As described, the logical CU being influenced by the path failure can be migrated to a storage system that is directly connected to the storage system having the GDEV. Further, the GDEV can be migrated to the migration destination storage system of the logical CU, based on which the performance can be improved further.

As described, according to Embodiment 2, the allocation of the logical CU can be changed so as not to deteriorate the input/output performance of the virtual storage system when failure occurs to the paths connecting the storage systems.

Embodiment 3

Embodiment 3 is an embodiment for detecting the bottleneck of the virtual storage system according to Embodiment 1 or Embodiment 4 described later, and migrating a logical CU already allocated to a storage system to another storage system. The logical unit allocation management unit 300 allocates logical CUs 110 to multiple storage systems 10 constituting the virtual storage system in response to the load of the storage system 10.

Figure 19:
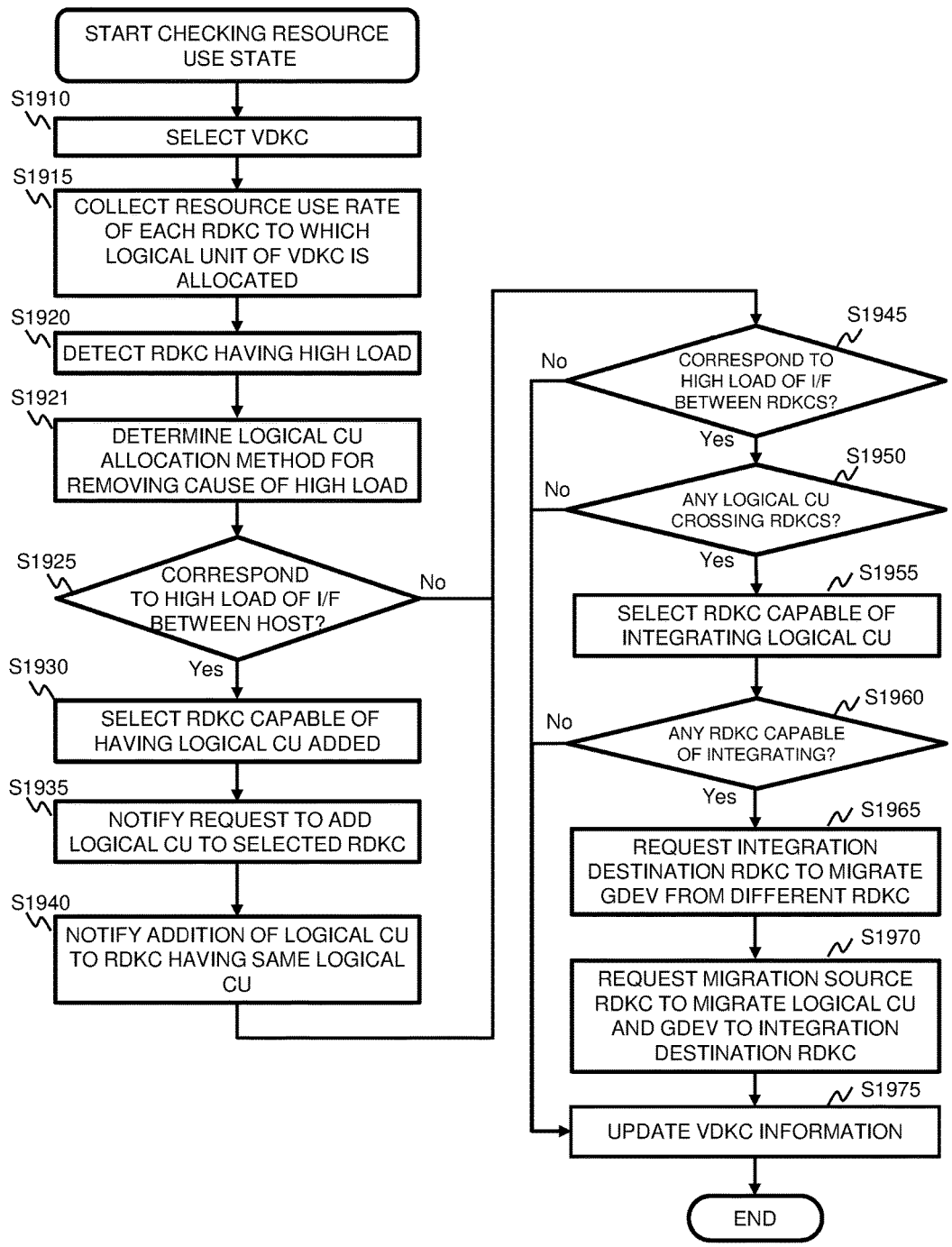
FIG. 19 is a flowchart illustrating a process for migrating a logical CU according to the state of use of resources according to Embodiment 3.

FIG. 19 is a flowchart illustrating the process for migrating a logical CU in response to the status of use of resources according to Embodiment 3.

At first, in step S1910, the logical unit allocation management unit 300 selects a virtual storage system 100 whose status of use of resources is to be checked. In the example, the virtual storage system identifier VDKC stored in the field 301 of the configuration information of the virtual storage system of FIG. 3 is selected.

Thereafter, in step S1915, the logical unit allocation management unit 300 acquires a resource use rate of the VDKC from the storage system 10 constituting the VDKC selected in the previous step S1910. Here, the logical unit allocation management unit 300 acquires the information from the storage system 10 stored in fields 302 through 305 of the entry of the VDKC constituting the configuration information of the virtual storage system in FIG. 3.

Next, in step S1920, the logical unit allocation management unit 300 uses the resource use rate acquired in the previous step S1915 to detect a high-load resource. In the following step S1921, the logical unit allocation management unit 300 determines which of the detected resources having a high load should have its load reduced. For example, if the number of RDKCs to which the logical CU is allocated is one, the load of the frontend I/F 14 between the host computer 20 and the storage system 10 is set to be reduced. However, if the number of RDKCs to which the logical CU is allocated is two or more, the amount of data transfer between RDKCs having the highest load of the logical CU having the largest number of RDKCs is set to be reduced.

As a result, in the following step S1925, the logical unit allocation management unit 300 determines whether the load of the frontend I/F 14 between the host computer 20 and the storage system 10 has been reduced or not, and if the load between the host computer 20 and the storage system 10 is not reduced (No), the procedure advances to step S1945. However, if the logical unit allocation management unit 300 determines that the load between the host computer 20 and the storage system 10 has been reduced (Yes), then in step S1930, it selects a different storage system 10 (hereinafter abbreviated as RDKC) capable of adding the logical CU 110 allocated to the storage system 10.

In the present example, the logical unit allocation management unit 300 selects an RDKC to which the logical CU is not allocated out of the RDKCs allocated to the VDKC, using the configuration information of the virtual storage system of FIG. 3 and the logical CU allocation information of the virtual storage system of FIG. 5. If there are multiple corresponding RDKCs, the RDKC is selected using the connection information between RDKCs of FIG. 4 and the configuration information of the storage system of FIG. 9. The basis of selection is the bandwidth between RDKCs (FIG. 4), and that there is sufficient processor performance 2003 and cache capacity 2004 (FIG. 9).

Thereafter, in step S1935, the logical unit allocation management unit 300 requests addition of a logical CU to the RDKC selected in the previous step S1930. The RDKC having received this request processes the logical CU allocation processing program LCUALP (FIG. 2) to allocate a logical CU (process of FIG. 11), and adds the logical CU to the information illustrated in FIG. 6 and FIG. 8.

Next, in step S1940, the logical unit allocation management unit 300 notifies that the logical CU has been added in the previous step S1935 to a different RDKC to which the added logical CU is allocated. For example, if a logical CU 2 of VDKC2 is added to RDKC3, the logical unit allocation management unit 300 notifies the information to RDKC1 and RDKC2 to which the logical CU 2 had been originally allocated. The RDKC having received this notice adds an entry to the information illustrated in FIG. 6 and FIG. 8, stores the VDKC in fields 601 and 801, and stores the logical CU number in fields 602 and 802. Further, the identifier of the added RDKC is stored in field 604, but since the added RDKC does not have a GDEV allocated thereto, a null value is stored in fields 603 and 803, fields 605 and 805, and fields 606 and 806.

Thereafter, in step S1945, the logical unit allocation management unit 300 determines whether the load of the frontend I/F 14 between RDKCs is reduced or not. Now, when the logical unit allocation management unit 300 determines that load between RDKCs is not reduced (No), then the information is updated in step S1975 as described later, and the process is ended. On the other hand, when the logical unit allocation management unit 300 determines that the load between RDKCs is reduced (Yes), then in step S1950, it determines whether there is a logical CU 120 allocated to both the RDKCs connected via the high-load frontend I/F 14. In this step, the logical unit allocation management unit 300 uses a logical CU allocation information of the virtual storage system of FIG. 5 to determine the same.

If the logical unit allocation management unit 300 determines in step S1950 that there is no logical CU 120 allocated to both RDKCs (No), then information update described later is performed in step S1975, and the process is ended.

On the other hand, if the logical unit allocation management unit 300 determines in step S1950 that there is a logical CU 120 allocated to both RDKCs (Yes), then in step S1955, it selects an RDKC capable of integrating the logical CUs. Here, the logical unit allocation management unit 300 selects an RDKC that does not have a high load applied on the frontend I/F 14 between the host computer 20 and the RDKC, having a large amount of remaining GDEV allocation capacity and having a sufficient processor performance and cache capacity in FIG. 9 out of the RDKCs connected via the high-load frontend I/F 14.

Thereafter, in step S1960, the logical unit allocation management unit 300 determines whether an RDKC matching conditions had been selected in the previous step S1955. If an RDKC had not been selected (No), it means that improvement of performance is not possible even by integrating logical CUs, so that the logical unit allocation management unit 300 performs update of information described later in step S1975, and ends the process. On the other hand, if an RDKC had been selected (Yes), the logical unit allocation management unit 300 requests migration of GDEV from a different RDKC to the selected RDKC in step S1965. The RDKC having received this request allocates an LDEV storing the data of the GDEV being migrated thereto, and updates the information in fields 604 through 606 of FIG. 6 and field 804 of FIG. 8.

Next, in step S1970, the logical unit allocation management unit 300 requests the migration source RDKC to migrate the logical CU and the GDEV to the integration destination RDKC. The migration source RDKC having received this request copies the data in the GDEV to the integration destination RDKC, and deletes the entry of the migrated logical CU from the information of FIG. 6 and FIG. 8.

Lastly, in step S1975, the logical unit allocation management unit 300 updates the logical CU allocation information of the virtual storage system in FIG. 5, and ends the process. Now, the logical unit allocation management unit 300 deletes the information on the migration source RDKC from fields 503 through 505 of the entries of the integrated logical CU.

As described, according to Embodiment 3, the allocation of the logical CU and the GDEV can be changed in response to the load of the frontend I/F 14, and the input/output performance of the virtual storage system can be improved.

Embodiment 4

The storage system according to Embodiment 4 is an embodiment where the storage controller 11 of the storage system 10 constituting the virtual storage system 100 of Embodiment 1 retains a data communication unit 19, and the input/output performance of the virtual storage system 100 can be improved by transferring data between the data communication units 19. Further, the processes performed according to the respective flowcharts illustrated in FIGS. 10 through 15 of Embodiment 1 and the flowcharts of FIGS. 17 and 19 of Embodiments 2 and 3 are also executed in the storage system of Embodiment 4.

Figure 21:
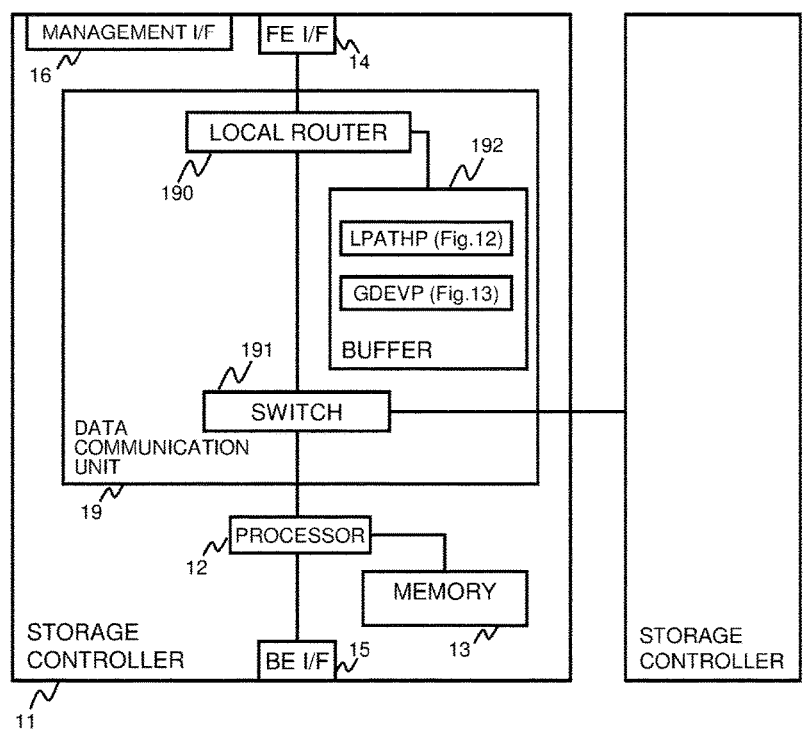
FIG. 21 is a block diagram illustrating an outline of a configuration of a storage controller having a local router according to Embodiment 4.

FIG. 21 is a block diagram illustrating the outline of configuration of the storage controller 11 having the data communication unit 19 according to Embodiment 4.

The data communication unit 19 is composed of a local router 190 connected to the frontend I/F 14, a switch 191 connected to the processor 12 and other storage systems, and a buffer 192. The local router 190 controls data transfer between the frontend I/F 14 and the buffer 192, data transfer between the buffer 192 and the processor 12, and the data transfer between the buffer 192 and other storage systems 10.

The buffer 192 retains the logical path generation program LPATHP for processing the logical path generation request and the GDEV management program GDEVP for processing the access request of the GDEV 120, which have been stored in the memory 13 of the storage controller 11 according to Embodiment 1.

When the local router 190 receives a logical path generation request from the frontend I/F 14 to the virtual storage system 100, it executes the logical path generation program LPATHP, and determines whether the logical CU 110 being the logical path generation target has been allocated or not, and if it is not allocated, returns a response notifying that logical path generation cannot be performed.

When the local router 190 receives an input/output request to the virtual storage system 100 from the frontend I/F 14, it executes a GDEV management program GDEVP, determines whether the access destination logical CU 110 and the allocation destination of the GDEV 120 is an LDEV or a different RDKC, and if the destination is a different RDKC, transfers the input/output request to the storage controller 11 thereof.

As described, according to Embodiment 4, the logical path generation request and the GDEV input/output request is processed by the local router 190 instead of the processor 12 of the storage controller 11, so that the data to the logical CU allocated to a different storage system is transferred among data communication units. Thereby, the load applied to the processor 12 of the storage controller 11 can be reduced, and the performance of the virtual storage system can be improved.

REFERENCE SIGNS LIST

1 Computer system
10 Storage system
11 Storage controller
12 Processor
13, 33 Memory
14 Frontend I/F
15 Backend I/F
16 Management I/F
17 Storage device
19 Data communication unit
20 Host computer
21 Channel
30 Management server
100 Virtual storage system
110 Logical control unit (Logical CU)
120 Global device (GDEV)
170 Logical device (LDEV)
190 Local router
200 Device definition information
210 Sub-channel
220 Channel path identifier
230 Path group
300 Logical unit allocation management unit

The invention claimed is:

1. A computer system comprising:
multiple storage systems connected to at least one host computer via a network; and
a logical unit allocation management unit for allocating a logical control unit, which includes a volume recognized by the host computer, wherein a logical path is established between the logical control unit and the host computer, to a virtual storage system composed of the multiple storage systems, wherein, if the logical control unit has not been allocated, the logical unit allocation management unit determines a storage system having a small number of allocated logical control units or a large amount of unused storage capacity based on allocation information indicating other previously allocated logical control units to respective other virtual storage systems and indicating a respective capacity information of the multiple storage systems, and requests the allocation of the logical control unit and generation of the volume included in the logical control unit to the determined storage system; and wherein, if the logical control unit is already allocated to the virtual storage system composed of the multiple storage systems, the logical unit allocation management unit requests to select, from the multiple storage systems, a storage system having a small number of allocated logical control units or having a large amount of unused storage capacity and to generate the volume included in the logical control unit to the selected storage system.

2. The computer system according to claim 1, wherein when an unused storage capacity of the storage system to which generation of the volume is requested is not sufficient to generate the volume, the logical unit allocation management unit migrates a different logical control unit and a volume having a small load within the storage system to a different storage system.

3. The computer system according to claim 1, wherein when an unused storage capacity of the storage system to which the logical control unit is already allocated is not sufficient to generate the volume, the logical unit allocation management unit requests a different storage system to which the logical control unit is not allocated, to migrate a volume having a low access frequency within the storage system to which the logical control unit is already allocated, to said different storage system that does not have the logical control unit allocated thereto.

4. The computer system according to claim 1, wherein when an unused storage capacity of the storage system to which the logical control unit is already allocated is not sufficient to generate the volume, the logical unit allocation management unit requests a storage system having a sufficient bandwidth between multiple storage systems to add an identical logical control unit and to generate the volume.

5. The computer system according to claim 1, wherein when a request to generate the logical path is received, each of the multiple storage systems will not accept the request when the logical control unit being the target of logical path generation is not allocated to its own storage system.

6. The computer system according to claim 1, wherein when an input/output request to the volume is received, each of the multiple storage systems determines whether a request target volume and a logical control unit corresponding to the request target volume is allocated to its own storage system or not;

determines an input/output error if the logical control unit is not allocated thereto; and if the logical control unit is allocated thereto but the request target volume is not allocated, transfers the input/output request to a storage system to which the request target volume is allocated.

7. The computer system according to claim 1, wherein when a request to acquire control information of the logical control unit from the host computer is received, each of the multiple storage systems transfers the request to a different storage system to which the logical control unit being the target of the request is allocated, collects and integrates the control information of all storage systems to which the logical control unit being the target of the request is allocated, and responds to the host computer.

8. The computer system according to claim 1, wherein based on collected information on a resource usage rate of the virtual storage system, the logical unit allocation management unit:

detects a storage system having a high resource usage rate among the host computer and the multiple storage systems, and requests a different storage system not having a logical control unit allocated thereto and having spare resource usage rate to add the logical control unit allocated to the detected storage system; or detects storage systems mutually having a high resource usage rate among the multiple storage systems, and requests the storage system having a higher resource usage rate to delete a logical control unit allocated to both detected storage systems.

9. The computer system according to claim 8, wherein if the logical unit allocation management unit detects the storage systems mutually having the high resource usage rate among the multiple storage systems and requests the storage system having the higher resource usage rate to delete the logical control unit allocated to both detected storage systems, the logical unit allocation management unit requests both detected storage systems to migrate a volume currently allocated to the storage system having a higher resource usage rate to a storage system having a lower resource usage rate.

10. A method for allocating a logical unit for allocating a logical control unit, which includes a volume recognized by the host computer, wherein a logical path is established between the logical control unit and the host computer, to a virtual storage system composed of multiple storage systems, the method comprising:

if the logical control unit has not been allocated, determining a storage system having a small number of allocated logical control units or a large amount of unused storage capacity based on allocation information indicating other previously allocated logical control units to respective other virtual storage systems and indicating a respective capacity information of the multiple storage systems, and requesting the allocation of the logical control unit and generation of the volume included in the logical control unit to the determined storage system; and if the logical control unit is already allocated to the virtual storage system composed of the multiple storage systems, requesting to select, from the multiple storage systems, a storage system having a small number of allocated logical control units or having a large amount of unused storage capacity and to generate the volume included in the logical control unit to the selected storage system.

11. The method for allocating a logical unit according to claim 10, further comprising:

collecting a resource usage rate of the virtual storage system;

based on information of the collected resource usage rate, detecting a storage system having a high resource usage rate between the host computer and the multiple storage systems, and requesting a different storage system to which the logical control unit is not allocated and having spare resource usage rate to add the logical unit allocated to the detected storage system to said different storage system; and based on the information of the collected resource usage rate, a step of detecting storage systems mutually having a high resource usage rate among the multiple storage systems, and requesting the storage system having a higher resource usage rate to delete a logical control unit allocated to both the detected storage systems.

12. The method for allocating a logical unit according to claim 11, further comprising:

if the storage systems mutually having the high resource usage rate among the multiple storage systems are detected and the storage system having the higher resource usage rate is requested to delete the logical control unit allocated to both detected storage systems, requesting both detected storage systems to migrate a volume currently allocated to the storage system having a higher resource usage rate to a storage system having a lower resource usage rate.

13. The method for allocating a logical unit according to claim 10, further comprising:

when an unused storage capacity of the storage system to which generation of the volume is requested is not sufficient to generate the volume, migrating a different logical control unit and a volume having a small load within the storage system to a different storage system.

14. The method for allocating a logical unit according to claim 10, further comprising:

when an unused storage capacity of the storage system to which the logical control unit is already allocated is not sufficient to generate the volume, requesting a different storage system to which the logical control unit is not allocated, to migrate a volume having a low access frequency within the storage system to which the logical control unit is already allocated, to said different storage system that does not have the logical control unit allocated thereto.

15. The method for allocating a logical unit according to claim 10, further comprising:

when an unused storage capacity of the storage system to which the logical control unit is already allocated is not sufficient to generate the volume, requesting a storage system having a sufficient bandwidth between multiple storage systems to add an identical logical control unit and to generate the volume.

16. The method for allocating a logical unit according to claim 10, further comprising:

when a request to generate the logical path is received, each of the multiple storage systems not accepting the request when the logical control unit being the target of logical path generation is not allocated to its own storage system.

17. The method for allocating a logical unit according to claim 10, further comprising:

when an input/output request to the volume is received, each of the multiple storage systems determining whether a request target volume and a logical control unit corresponding to the request target volume is allocated to its own storage system or not;

determining an input/output error if the logical control unit is not allocated thereto; and if the logical control unit is allocated thereto but the request target volume is not allocated, transferring the input/output request to a storage system to which the request target volume is allocated.

18. The method for allocating a logical unit according to claim 10, further comprising:

when a request to acquire control information of the logical control unit from the host computer is received, each of the multiple storage systems transferring the request to a different storage system to which the logical control unit being the target of the request is allocated, collecting and integrating the control information of all storage systems to which the logical control unit being the target of the request is allocated, and responding to the host computer.

* * * * *